United States Patent
Ardo et al.

(10) Patent No.: US 12,233,381 B2
(45) Date of Patent: Feb. 25, 2025

(54) MEMBRANES FOR ENHANCING RATES OF WATER DISSOCIATION AND WATER FORMATION

(71) Applicant: THE REGENTS OF THE UNIVERSITY OF CALIFORNIA, Oakland, CA (US)

(72) Inventors: Shane Ardo, Irvine, CA (US); William White, Irvine, CA (US); Lawrence A. Renna, Irvine, CA (US); Rohit Bhide, Irvine, CA (US); Leanna Schulte, Irvine, CA (US); Gabriel S. Phun, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1087 days.

(21) Appl. No.: 17/084,425

(22) Filed: Oct. 29, 2020

(65) Prior Publication Data
US 2021/0046423 A1 Feb. 18, 2021

Related U.S. Application Data

(63) Continuation-in-part of application No. PCT/US2020/032705, filed on May 13, 2020.
(Continued)

(51) Int. Cl.
*B01D 61/46* (2006.01)
*B01D 61/44* (2006.01)
(Continued)

(52) U.S. Cl.
CPC ......... *B01D 61/465* (2022.08); *B01D 61/445* (2013.01); *B01D 61/466* (2022.08);
(Continued)

(58) Field of Classification Search
None
See application file for complete search history.

(56) References Cited

U.S. PATENT DOCUMENTS

| | | | |
|---|---|---|---|
| 3,784,457 A | 1/1974 | Mizutani et al. | |
| 4,766,161 A * | 8/1988 | Chlanda | C08J 5/2275 428/522 |

(Continued)

OTHER PUBLICATIONS

Sahiner et al. (Colloids and Surfaces A: Physiochem. Eng. Aspects, 2013, 418, 76-83). (Year: 2013).*
(Continued)

*Primary Examiner* — Clare M Perrin
(74) *Attorney, Agent, or Firm* — NGUYEN TARBET IP LAW

(57) ABSTRACT

Membranes for electrochemical technologies that operate at non-extreme acidic or basic conditions are described herein. The membrane can be a bipolar membrane having an anion-exchange layer, a cation-exchange layer, and a polymer layer containing a catalyst juxtaposed between the two layers. The catalyst can improve the rate for water dissociation and water formation at low applied bias thereby decreasing the overpotential and resistance for overall ion transport, especially when unequal pH values are used between the catholyte and anolyte.

6 Claims, 9 Drawing Sheets
(8 of 9 Drawing Sheet(s) Filed in Color)

Related U.S. Application Data

(60) Provisional application No. 62/847,118, filed on May 13, 2019.

(51) Int. Cl.

| | | |
|---|---|---|
| *B01D 69/02* | (2006.01) | |
| *B01D 69/12* | (2006.01) | |
| *B01J 43/00* | (2006.01) | |
| *B01J 45/00* | (2006.01) | |
| *B01J 47/12* | (2017.01) | |
| *C02F 1/42* | (2023.01) | |

(52) U.S. Cl.
CPC ............. *B01D 69/02* (2013.01); *B01D 69/12* (2013.01); *B01J 43/00* (2013.01); *B01J 45/00* (2013.01); *B01J 47/12* (2013.01); *C02F 1/42* (2013.01)

(56) References Cited

U.S. PATENT DOCUMENTS

| | | |
|---|---|---|
| 6,274,806 B1 | 8/2001 | Sugihara et al. |
| 6,878,287 B1 | 4/2005 | Marais |
| 8,764,957 B2 | 7/2014 | Sui et al. |
| 2007/0099055 A1 | 5/2007 | Lee et al. |
| 2008/0213641 A1 | 9/2008 | Ostermann et al. |
| 2010/0143811 A1 | 6/2010 | Brimblecombe et al. |
| 2011/0088757 A1 | 4/2011 | Highgate et al. |
| 2012/0097541 A1 | 4/2012 | Yazdanbod |
| 2012/0309045 A1 | 12/2012 | Knutson et al. |
| 2012/0312737 A1 | 12/2012 | Miller |
| 2013/0041353 A1 | 2/2013 | Shin et al. |
| 2013/0168228 A1 | 7/2013 | Ozin et al. |
| 2015/0298100 A1 | 10/2015 | Hill et al. |
| 2016/0067669 A1 | 3/2016 | Willey et al. |
| 2016/0158690 A1 | 6/2016 | Puxty et al. |
| 2016/0310899 A1 | 10/2016 | Bordain et al. |
| 2017/0320053 A1 | 11/2017 | Moon et al. |
| 2017/0373335 A1 | 12/2017 | Aetukuri et al. |
| 2018/0065095 A1 | 3/2018 | Ardo et al. |
| 2018/0145271 A1 | 5/2018 | Kedem et al. |
| 2019/0134570 A1 | 5/2019 | Pintauro et al. |

OTHER PUBLICATIONS

Pekel et al. (Colloid Polymer Sci, 1999, 277, 570-573). (Year: 1999).*
Wilhelm et al. (Bipolar Membrane Electrodialysis, Ph.D. thesis, 2001, Twente University Press, 1-242). (Year: 2001).*
Balster et al. (Journal of Membrane Science, 2010, 365, 389-398). (Year: 2010).*
Piprek et al. "Electroluminescent cooling mechanism in InGaN/GaN light-emitting diodes." Optical and Quantum Electronics 48.10 (2016): 1-7.
J. Luo et al. "Water photolysis at 12.3% efficiency via perovskite photovoltaics and Earth-abundant catalysts", Science 345 (2014) 1593-1596, https://doi.org/10.1126/science.1258307.
Miller et al. "Strong internal and external luminescence as solar cells approach the Shockley-Queisser limit." IEEE Journal of Photovoltaics 2.3 (2012): 303-311.
Man et al. "Universality in oxygen evolution electrocatalysis on oxide surfaces." ChemCatChem 3.7 (2011): 1159-1165.
Sanehira et al. "Enhanced mobility CsPbI3 quantum dot arrays for record-efficiency, high-voltage photovoltaic cells." Science advances 3.10 (2017): eaao4204.
Protesescu et al. "Nanocrystals of cesium lead halide perovskites (CsPbX3, X=Cl, Br, and I): novel optoelectronic materials showing bright emission with wide color gamut." Nano letters 15.6 (2015): 3692-3696.
Fountaine et al. "Efficiency limits for photoelectrochemical water-splitting." Nature communications 7.1 (2016): 1-9.
James et al. "Voltage-gated ion transport through semiconducting conical nanopores formed by metal nanoparticle-assisted plasma etching." Nano letters 12.7 (2012): 3437-3442.
Guan et al. "Field-effect reconfigurable nanofluidic ionic diodes." Nature communications 2.1 (2011): 1-8.
Guan et al. "Voltage gated ion and molecule transport in engineered nanochannels: theory, fabrication and applications." Nanotechnology 25.12 (2014): 122001.
Ardo et al. "Systems and methods for integrated solar photodialysis." U.S. Appl. No. 16/367,102.
Xiao et al. "Artificial light-driven ion pump for photoelectric energy conversion." Nature communications 10.1 (2019): 1-7.
Xie et al. "Photocurrent generation based on a light-driven proton pump in an artificial liquid membrane." Nature chemistry 6.3 (2014): 202-207.
Siwy et al. "Fabrication of a synthetic nanopore ion pump." Physical Review Letters 89.19 (2002): 198103.
Siwy et al. "A nanodevice for rectification and pumping ions." American Journal of Physics 72.5 (2004): 567-574.
Sanborn et al. "Interfacial and nanoconfinement effects decrease the excited-state acidity of polymer-bound photoacids." Chem 5.6 (2019): 1648-1670.
Kedem et al. "How to drive a flashing electron ratchet to maximize current." Nano letters 17.9 (2017): 5848-5854.
Tarlie et al. "Optimal modulation of a Brownian ratchet and enhanced sensitivity to a weak external force." Proceedings of the National Academy of Sciences 95.5 (1998): 2039-2043.
Kedem et al. "Mechanisms of Symmetry Breaking in a Multidimensional Flashing Particle Ratchet." ACS nano 11.7 (2017): 7148-7155.
Kedem et al. "Light-responsive organic flashing electron ratchet." Proceedings of the National Academy of Sciences 114.33 (2017): 8698-8703.
Yan et al. "The balance of electric field and interfacial catalysis in promoting water dissociation in bipolar membranes." Energy & Environmental Science 11.8 (2018): 2235-2245.
Lau et al. "An introduction to ratchets in chemistry and biology." Materials Horizons 4.3 (2017): 310-318.
Lehmann, V. "The physics of macropore formation in low doped n-type silicon." Journal of the Electrochemical Society 140.10 (1993): 8 pages.
Kedem et al. "Cooperative Transport in a Multi-Particle, Multi-Dimensional Flashing Ratchet." The Journal of Physical Chemistry C 123.11 (2019): 6913-6921.
United Nations, "Water Scarcity", accessed Mar. 31, 2022; 5 pages.
Li et al. "Solar assisted sea water desalination: A review." Renewable and Sustainable Energy Reviews 19 (2013): 136-163.
Liu et al. "Experimental analysis of a portable atmospheric water generator by thermoelectric cooling method." Energy Procedia 142 (2017): 1609-1614.
Swiss Water Tech Research & Development, "Atmosphere Water Generator (AWG)" accessed Mar. 31, 2022, 6 pages.
U.S. Energy Information Administration, "Use of energy explained Energy use in homes" (2021) 5 pages.
U.S. Energy Information Administration, "Space heating and water heating account for nearly two thirds of U.S. home energy use" (2018) 3 pages.
U.S. Energy Information Administration, "Heating and cooling no longer majority of U.S. home energy use" (2013) 2 pages.
Nemova et al. "Laser cooling of solids." Reports on Progress in Physics 73.8 (2010): 086501.
Sheik-Bahae et al. "Optical refrigeration." nature photonics 1.12 (2007): 693-699.
Zhang et al. "Laser cooling of a semiconductor by 40 kelvin." Nature 493.7433 (2013): 504-508.
Seletskiy et al. "Laser cooling of solids to cryogenic temperatures." Nature Photonics 4.3 (2010): 161-164.
Santhanam et al. "Thermoelectrically pumped light-emitting diodes operating above unity efficiency." Physical Review Letters 108.9 (2012): 097403.

(56) References Cited

OTHER PUBLICATIONS

Chen et al. "High-performance near-field electroluminescent refrigeration device consisting of a GaAs light emitting diode and a Si photovoltaic cell." Journal of Applied Physics 122.14 (2017): 143104.
Xiao et al. "Electroluminescent refrigeration by ultra-efficient GaAs light-emitting diodes." Journal of Applied Physics 123.17 (2018): 173104.
Zhao et al. "Self-sustaining thermophotonic circuits." Proceedings of the National Academy of Sciences 116.24 (2019): 11596-11601.
Lin et al. "Near-field enhancement of thermoradiative devices." Journal of Applied Physics 122.14 (2017): 143102.
U.S. Environmental Protection Agency, "How We Use Water" accessed Mar. 31, 2022, 9 pages.
SunPower Corporation, "Solar Panels Based on Maxeon Solar Cell Technology" accessed Mar. 31, 2022, 7 pages.
Brackmann, "Laser Dyes" 3rd edition, (2000) 294 pages.
Luxottica / Exciton, "Laser Dyes" accessed Mar. 31, 2022, 11 pages.
Li et al. "Combined theoretical and experimental study of band-edge control of Si through surface functionalization." The Journal of Physical Chemistry C 117.10 (2013): 5188-5194.
Mongin et al. "Thermally activated delayed photoluminescence from pyrenyl-functionalized CdSe quantum dots." Nature Chemistry 10.2 (2018): 225-230.
Lewis, Nathan S. "A Quantitative Investigation of the Open-Circuit Photovoltage at the Semiconductor/Liquid Interface." Journal of The Electrochemical Society 131.11 (1984): 2496.
Grimm et al. "Comparison of the photoelectrochemical behavior of H-terminated and methyl-terminated Si (111) surfaces in contact with a series of one-electron, outer-sphere redox couples in CH3CN." The Journal of Physical Chemistry C 116.44 (2012): 23569-23576.
Optical Properties of Silicon. PVEDUCATION, May 25, 2018 {May 25, 2018). p. 1-3. [retrieved 27 4.9 Mar. 2, 2020 {Mar. 27, 2020) from<https:web.archive.org web/20 180525182157/https:Www. pveducation .org/pvcdrom/.
Seletskiy et al. "Local laser cooling of Yb: YLF to 110 K." Optics express 19.19 (2011): 18229-18236.
Yu et al. "Fundamental mechanisms of electroluminescence refrigeration in heterostructure light-emitting diodes." Light-Emitting Diodes: Research, Manufacturing, and Applications XI. vol. 6486. SPIE, 2007.
Tributsch, Helmut. "Light driven proton pumps." Ionics 6.3 (2000): 161-171.
Steinberg-Yfrach, et al. "Conversion of light energy to proton potential in liposomes by artificial photosynthetic reaction centres." Nature 385.6613 (1997): 239-241.
Xie et al. "Supplementary Information, Photocurrent generation based on a light-driven proton pump in an artificial liquid membrane." Nature chemistry 6.3 (2014): 15 pages.
Sun et al. "A simple light-driven transmembrane proton pump." Proceedings of the National Academy of Sciences 93.20 (1996): 10758-10762.
Kolbe, Michael, et al. "Structure of the light-driven chloride pump halorhodopsin at 1.8 Å resolution." Science 288.5470 (2000): 1390-1396.
White et al. "Conversion of visible light into ionic power using photoacid-dye-sensitized bipolar ion-exchange membranes." Joule 2.1 (2018): 94-109.
Reiter, Ronald. Electrochemical Evaluation of Bipolar Ion-Exchange Membranes for Solar Fuels. Diss. UC Irvine, 2015.
Chambers et al. "Efficient photochemical dihydrogen generation initiated by a bimetallic self-quenching mechanism." Journal of the American Chemical Society 138.41 (2016): 13509-13512.
Stewart et al. "Accelerating slow excited state proton transfer." Proceedings of the National Academy of Sciences 110.3 (2013): 876-880.
Mauzerall et al. "A simple light-driven transmembrane proton pump." Proceedings of the National Academy of Sciences 93.20 (1996): 10758-10762.

Murphy, "Model systems in photoelectrochemical energy conversion." Solar Energy 21.5 (1978): 403-407.
Sanborn et al. "Photoelectrochemical Ion Pumping with Dye-Functionalized Polymer Membranes." ECS Meeting Abstracts. No. 37. IOP Publishing, 2015.
White et al. "Sunlight-Driven Ionic Power Generation from Bipolar Ion-Exchange Membranes Functionalized with Photoacids." ECS Meeting Abstracts. No. 38. IOP Publishing, 2016.
White et al. "Observation of photovoltaic action from photoacid-modified nafion due to light-driven ion transport." Journal of the American Chemical Society 139.34 (2017): 11726-11733.
Li et al. "Comb-shaped polymers to enhance hydroxide transport in anion exchange membranes." Energy & Environmental Science 5.7 (2012): 7888-7892.
Wang et al. "Alkaline stability of poly (phenylene oxide) based anion exchange membranes containing imidazolium cations." Journal of The Electrochemical Society 163.8 (2016): F824.
Lashkaryov,. "Investigations of a barrier layer by the thermoprobe method." Izv. Akad. Nauk SSSR, Ser. Fiz 5.4-5 (1941): 442-446.
Fuller, "Some analogies between semiconductors and electrolyte solutions." Rec. Chem. Prog 17.2 (1956): 75-93.
Chapin et al. "A new silicon pn junction photocell for converting solar radiation into electrical power." Semiconductor Devices: Pioneering Papers. 1991. 969-970.
Lovrecek et al. "Electrolytic junctions with rectifying properties." The Journal of Physical Chemistry 63.5 (1959): 750-751.
Maslov et al. "Water as a Semiconductor." Russian Chemical Reviews 37.4 (1968): 310.
Pearson et al. "Electrical properties of pure silicon and silicon alloys containing boron and phosphorus." Physical Review 75.5 (1949): 865.
Roses et al. "Autoprotolysis in aqueous organic solvent mixtures." Analytical Chemistry 65.17 (1993): 2294-2299.
Rondinini et al. "Autoprotolysis constants in nonaqueous solvents and aqueous organic solvent mixtures." Pure and Applied Chemistry 59.12 (1987): 1693-1702.
Würfel, P. "Physics of solar cells: From principles to new concepts. Verlag GmbH & Co KGaA." (2005), 188 pages.
Battaglia et al. "High-efficiency crystalline silicon solar cells: status and perspectives." Energy & Environmental Science 9.5 (2016): 1552-1576.
Shockley et al. "Detailed balance limit of efficiency of p-n junction solar cells." Journal of applied physics 32.3 (1961): 510-519.
Würthner et al. "J-aggregates: from serendipitous discovery to supramolecular engineering of functional dye materials." Angewandte Chemie International Edition 50.15 (2011): 3376-3410.
Ardo, et al. "Excited-state electron transfer from ruthenium-polypyridyl compounds to anatase TiO2 nanocrystallites: evidence for a stark effect." The Journal of Physical Chemistry B 114.45 (2010): 14596-14604.
Ardo et al. "Stark effects after excited-state interfacial electron transfer at sensitized TiO2 nanocrystallites." Journal of the American Chemical Society 132.19 (2010): 6696-6709.9.
Pensack et al. "Ultrafast vibrational spectroscopy of charge-carrier dynamics in organic photovoltaic materials." Physical Chemistry Chemical Physics 11.15 (2009): 2575-2591.
Zhang et al. "Imidazolium functionalized polysulfone anion exchange membrane for fuel cell application." Journal of Materials Chemistry 21.34 (2011): 12744-12752.
Wang et al. "Preparation of alkaline anion exchange membranes based on functional poly (ether-imide) polymers for potential fuel cell applications." Journal of Membrane Science 326.1 (2009): 4-8.
Luo et al. "Diffusion dialysis of hydrochloride acid at different temperatures using PPO—SiO2 hybrid anion exchange membranes." Journal of Membrane Science 347.1-2 (2010): 240-249.
Khan et al. "Development of BPPO-based anion exchange membranes for electrodialysis desalination applications." Desalination 391 (2016): 61-68.
Merle et al. "Anion exchange membranes for alkaline fuel cells: A review." Journal of Membrane Science 377.1-2 (2011): 1-35.

(56) References Cited

OTHER PUBLICATIONS

Reiter et al. "Communication-electrochemical characterization of commercial bipolar membranes under electrolyte conditions relevant to solar fuels technologies." Journal of The Electrochemical Society 163.4 (2016): H3132.
Ünlü et al. "Hybrid anion and proton exchange membrane fuel cells." The Journal of Physical Chemistry C 113.26 (2009): 11416-11423.
Grew et al. "Understanding transport at the acid-alkaline interface of bipolar membranes." Journal of The Electrochemical Society 163.14 (2016): F1572.
Warrick et al. "Viscosity effects on ion-recombination kinetics. Bromocresol green in water-glycerol mixtures." The Journal of Physical Chemistry 76.8 (1972): 1184-1191.
Hegedus et al. "Electrolyte transistors: ionic reaction—diffusion systems with amplifying properties." The Journal of Physical Chemistry A 102.32 (1998): 6491-6497.
Spry et al. "Proton transfer and proton concentrations in protonated Nafion fuel cell membranes." The Journal of Physical Chemistry B 113.30 (2009): 10210-10221.
Eames et al. "Ionic transport in hybrid lead iodide perovskite solar cells." Nature communications 6.1 (2015): 1-8.
Bag et al. "Kinetics of ion transport in perovskite active layers and its implications for active layer stability." Journal of the American Chemical Society 137.40 (2015): 13130-13137.
Fabian et al. "Hybrid organic-inorganic solar cells based on bismuth iodide and 1, 6-hexanediammonium dication." Journal of Materials Chemistry A 4.18 (2016): 6837-6841.
Chen et al. "Spectral properties and dynamics of gold nanorods revealed by EMCCD-based spectral phasor method." Microscopy research and technique 78.4 (2015): 283-293.
Ramirez et al. "Current-voltage curves of bipolar membranes." Journal of applied physics 72.1 (1992): 259-264.
Mafé et al. "Electric field-assisted proton transfer and water dissociation at the junction of a fixed-charge bipolar membrane." Chemical Physics Letters 294.4-5 (1998): 406-412.
Mafe et al. "Electrochemical characterization of polymer ion-exchange bipolar membranes." Acta polymerica 48.7 (1997): 234-250.
Email communication from ProQuest to Examiner Raphael, Nov. 3, 2020 (Year: 2020) 1 page.
Gopidas et al. "Photochemistry in polymers: photoinduced electron transfer between phenosafranine and triethylamine in perfluorosulfonate membrane." Journal of Physical Chemistry 94.11 (1990): 4723-4727.
Johns et al. "Visible light activated ion sensing using a photoacid polymer for calcium detection." Analytical chemistry 86.13 (2014): 6184-6187.
Mohan et al. "Photochemical behaviour of rhodamine 6G in Nafion membrane." Journal of the Chemical Society, Faraday Transactions 88.1 (1992): 41-45.
Krishnan et al. "Integrated chemical systems: photocatalysis at semiconductors incorporated into polymer (Nafion)/mediator systems." Journal of the American Chemical Society 105.23 (1983): 7002-7003.
Mistlberger et al. "Photoresponsive ion extraction/release systems: dynamic ion optodes for calcium and sodium based on photochromic spiropyran." Analytical chemistry 85.5 (2013): 2983-2990.
O'Donnell et al. "Photoacidic and photobasic behavior of transition metal compounds with carboxylic acid group (s)." Journal of the American Chemical Society 138.11 (2016): 3891-3903.
Murphy, G. W. "Model systems in photoelectrochemical energy conversion." Solar Energy 21.5 (1978): 403-407.
Astom Corporation, "Comparison table for detailed specification of Cation/Anion Exchange Membrane". 2013, 1 page; http://www.astom-corp.jp/en/product/images/astom_hyo.pdf.
Tran et al. "The United Nations World Water Development Report, 2016: Water and Jobs: Facts and Figures." 2016, 12 pages.

Worldbank, "Water Overview" 2017, 3 pages; http://www.worldbank.org/en/topic/water/overview.
Ardo, S. Development of a Plastic Water Bottle for Sunlight-Driven Desalination. Distinctive Voices□Lecture Series; National Academy of Sciences, 2017, 1 page; https://www.youtube.com/watch?v=F3h41nPIjXY.
World Health Organization, "Total Dissolved Solids in Drinking-Water" Heal. criteria other Support. Inf. (1996) 8 pages.
Bell System Solar Battery Converts Sun's Ray into Electricity! Look Magazine. 1956, 1 page.
Haussener et al. "Modeling, simulation, and design criteria for photoelectrochemical water-splitting systems." Energy & Environmental Science 5.12 (2012): 9922-9935.
Hu et al. "An analysis of the optimal band gaps of light absorbers in integrated tandem photoelectrochemical water-splitting systems." Energy & Environmental Science 6.10 (2013): 2984-2993.
Xiang et al. "Modeling, simulation, and implementation of solar-driven water-splitting devices." Angewandte Chemie International Edition 55.42 (2016): 12974-12988.
Chandran et al. "Evaluating particle-suspension reactor designs for Z-scheme solar water splitting via transport and kinetic modeling." Energy & Environmental Science 11.1 (2018): 115-135.
Keene et al. "Calculations of theoretical efficiencies for electrochemically-mediated tandem solar water splitting as a function of bandgap energies and redox shuttle potential." Energy & Environmental Science 12.1 (2019): 261-272.
Wang et al. "Scalable water splitting on particulate photocatalyst sheets with a solar-to-hydrogen energy conversion efficiency exceeding 1%." Nature materials 15.6 (2016): 611-615.
Fabian et al. "Particle suspension reactors and materials for solar-driven water splitting." Energy & Environmental Science 8.10 (2015): 2825-2850.
Goto et al. "A particulate photocatalyst water-splitting panel for large-scale solar hydrogen generation." Joule 2.3 (2018): 509-520.
Eisler et al. "Multijunction solar cell efficiencies: effect of spectral window, optical environment and radiative coupling." Energy & Environmental Science 7.11 (2014): 3600-3605.
Tiedje et al. "Limiting efficiency of silicon solar cells." IEEE Transactions on electron devices 31.5 (1984): 711-716.
Chuang et al. "Open-circuit voltage deficit, radiative sub-bandgap states, and prospects in quantum dot solar cells." Nano letters 15.5 (2015): 3286-3294.
Swarnkar et al. "Quantum dot-induced phase stabilization of $\alpha$-CsPbI3 perovskite for high-efficiency photovoltaics." Science 354.6308 (2016): 92-95.
Yang et al. "High-performance photovoltaic perovskite layers fabricated through intramolecular exchange." Science 348.6240 (2015): 1234-1237.
Kulkarn et al. "Band-gap tuning of lead halide perovskites using a sequential deposition process." Journal of Materials Chemistry A 2.24 (2014): 9221-9225.
Wikipedia, "Silicon". Oct. 28, 2018, . p. 1-3.
Balster et al. "Tailoring the interface layer of the bipolar membrane." Journal of membrane science 365.1-2 (2010): 389-398.
Wilhelm, Friedrich G. "Bipolar membrane electrodialysis." University of Twente (2001) 242 pages.
Zhang et al. ""Uphill" cation transport: a bioinspired photo-driven ion pump." Science advances 2.10 (2016): e1600689.
Mei et al. "Gate modulation of proton transport in a nanopore." Physical Chemistry Chemical Physics 18.10 (2016): 7449-7458.
Balster, J., et al. "Tailoring the interface layer of the bipolar membrane." Journal of membrane science 365.1-2 (2010): 389-398, abstract; Fig 1, 3; p. 389, col. 1-p. 395, col. 2 [online] < https://www.sciencedirect.com/science/article/pii/S0376738810007313 >.
Wilhelm, Friedrich G. "Bipolar membrane electrodialysis." University of Twente (2001 ), entire document [online]: < https://ris.utwente.nl/ws/files/6074731/1000002b.pdf >.

\* cited by examiner

MEMBRANES FOR ENHANCING RATES OF WATER DISSOCIATION AND WATER FORMATION

CROSS-REFERENCES TO RELATED APPLICATIONS

This application is a continuation-in-part and claims benefit of PCT Application No. PCT/US20/32705, filed May 13, 2020, which claims benefit of U.S. Provisional Patent Application No. 62/847,118, filed May 13, 2019, the specifications of which are incorporated herein in its entirety by reference.

BACKGROUND OF THE INVENTION

Field of the Invention

The present invention relates to membranes for electrochemistry, including renewable fuel generation and use, $CO_2$ hydration and reduction, and electrodialysis, to improve the rate of water dissociation and water formation at low applied bias using non-extreme acidic or basic conditions that result in small electric fields and small loss in potential and better device efficiency.

Background Art

The primary energy source for more than 90% of society's power is in the form of potential energy stored in the bonds of chemical fuels, with the remainder coming from clean renewable and nuclear energy sources. While renewable and nuclear energy sources are ultimately used to generate electricity, potential energy in the bonds of chemical fuels is either converted into heat by uncontrolled oxidation through combustion, or converted into electricity by controlled oxidation via selective redox reactions. While combustion is in general facile, the efficiency of internal combustion engines to convert potential energy in the bonds of fuels into useful power is only ~40% and is limited by the Carnot heat engine efficiency limit. Redox on the other hand does not rely on heat, and therefore the limiting efficiency of fuel cells to convert potential energy in the bonds of fuels into electrical power can approach 100%. For this reason, electrolyzers for fuel generation and fuel cells for fuel use and concomitant electricity generation, are of great scientific and technological interest. Moreover, since these technologies are tied to electricity they can easily be operated by clean renewable and nuclear energy sources as our society transitions away from fossil fuels.

The following reactions of water electrolysis (forward reaction, $k_1$) and hydrogen oxidation (reverse reaction, $k_{-1}$) dominate the commercial electrolyzer and fuel cell market, respectively.

These reactions occur reversibly at a potential of 1.23 V under standard-state conditions, meaning unity activity of $H_2$, $O_2$, and $H_2O$. These reactions are prevalent in part because water and oxygen are both abundant and relatively benign, while hydrogen is the simplest chemical fuel to store $H^+$ and $e^-$ charge carriers and therefore is the fuel with the largest gravimetric energy density.

Notwithstanding, other reactions are also of interest, including those that involve cycles where both $H^+$ and $e^-$ are transferred to and from chemical substrates such as $CO_2$, $NH_3$, etc. Irrespective of the redox chemistry, the round-trip efficiency for storing both $H^+$ and $e^-$ in chemical bonds via electrolysis and releasing that energy in a fuel cell is currently limited to ~40%. Fundamentally, this efficiency is in part limited by the inability of prior technologies to optimally couple the transport and transfer of both $H^+$ and $e^-$ for bond making and bond breaking at electro-catalysts. While both $H^+$ and $e^-$ charge carriers are sourced and drained via redox reactions at electrode surfaces, $e^-$ are easily transported between reactive sites via the external circuit while $H^+$ must transport through more resistive electrolytes. Little effort has focused on engineering proton-transfer catalysts (collectively termed "proto-catalysts") to efficiently transfer $H^+$ to and from chemical substrates (FIG. 2A).

Irrespective of the proton-transfer mechanism(s) involved in Reaction 1, $H^+$ addition and $H^+$ removal from water are required. While these proton-transfer processes have occurred at proton-coupled electron-transfer catalysts, this is not strictly required. In fact, delegating catalysis of the following reactions of water dissociation (forward reaction, $k_2$) and water formation (reverse reaction, $k_{-2}$) to proton-transfer catalysts allows them and (proton-coupled) electron-transfer catalysts (termed "electro-catalysts") to be optimized for less demanding, more specific processes. Hence there is a need for processes that afford rapid catalysis of Reaction 2.

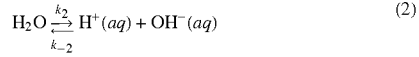

Many electrochemical technologies rely on ion-exchange membranes for the critical role of maintaining separation of certain mobile chemical species so that they do not react, while necessarily affording rapid conduction of specific mobile ions, typically $H^+$ and/or $OH^-$. Mobile chemical species range from redox-active molecules to inert counterions; and while membranes can slow their rate of crossover, membranes cannot completely prevent crossover of mobile chemical species. Unique to counterions is that they can be fixed to solid supports such that their crossover is impossible. This strategy is used in reversible $H_2/O_2$ fuel cells that employ membrane-electrode assemblies (MEAs), where fixed counterions are present in the form of membrane electrolytes that when wetted with deionized water dissociate $H^+$ and/or $OH^-$, which carry the ionic current. In this case, the pH of the membrane electrolyte dictates the local pH near the electro-catalysts and therefore, catalyst stability and activity. When the membrane electrolyte is composed of an acidic cation-exchange membrane (CEM) directly interfaced to an alkaline anion-exchange membrane (AEM), the overall structure is termed a bipolar membrane (BPM).

BPMs wetted by highly pure deionized water can theoretically support differences in pH indefinitely, and these pH values can be altered by varying the functionality, and therefore acidity, of the membranes. Ideally the pH is adjusted to within a range where desired proton-coupled electron-transfer catalysts are stable. The challenge in using BPMs in electrochemical technologies is that in order to facilitate an ionic current, BPMs must asymmetrically transport $H^+$ and $OH^-$ (FIGS. 2A-B). Asymmetric transport occurs via either formation of water via association of solvated $H^+$ and $OH^-$ (Reaction 2, reverse) at the CEM-AEM interface (CEM|AEM), or generation of solvated $H^+$ and $OH^-$ (Reaction 2, forward) at CEM|AEM through water dissociation. While a current density of more than 0.1 A cm$^{-2}$ can be sustained through $H^+$ and $OH^-$ association at rather low overpotentials, and is ultimately limited by the rate of diffusion of water out of the membrane, water dissociation that occurs at rates observed in bulk water and over space-charge-region widths that are typical of BPMs (1-10 nm) can only sustain a current density of ~10-100 nA cm$^{-2}$ even at large overpotentials.

State-of-the-art BPMs exhibit rates of water dissociation that are larger than occur in bulk water. Although the exact mechanisms that result in this behavior remain unclear, the leading proposed mechanisms are that the increase in the rate of water dissociation is due to: (i) an electric-field enhancement (EFE) at CEM|AEM; and/or (ii) a decrease in the activation energy based on a chemical reaction (CR) model. The EFE model is manifested by the following approximate phenomenological equation:

$$k_d = k_d^o e^{\frac{aFE}{RT}} \quad (3)$$

where $k_d^o$ is the effective rate constant for water dissociation under standard, room-temperature conditions, a is a microscopic parameter (with typical values of ~10$^{-10}$ m), F is the Faraday constant (96,485 C mol$^{-1}$), R is the ideal gas constant (8.314 J K$^{-1}$), T is the temperature (K), and E is the magnitude of the electric field (V m$^{-1}$). While this model reasonably predicts experimental rates of water dissociation at large overpotentials, it does not fully explain some experimental observations, such as water dissociation seems to be enhanced to a greater extent in AEMs, and by only affecting the rate of water dissociation it alters the thermodynamics of Reaction 2.

The CR model assumes that the rate of water dissociation is increased through the use of catalysts, which are often fixed charges at CEM|AEM, to facilitate water deprotonation and subsequent generation of a solvated proton according to the following reactions:

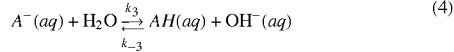

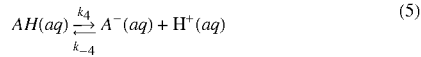

where AH/A$^-$ are conjugate Brønsted-Lowry acid/base pairs. This model is more challenging to assess and is often assumed to be operative in addition to the EFE mechanism. A$^-$/AH speeds up the rate of the overall water dissociation reaction by enabling faster rates of thermodynamically unfavorable generation (k$_3$ in Reaction 4 and k$_4$ in Reaction 5), yet not altering the thermodynamics for the overall process by also speeding up the rate of diffusion-limited recombination via mass action, i.e. based on the concentration of catalyst. In this regard, the rate of water dissociation can increase as the catalyst concentration increases, i.e. AH/A$^-$ (Reactions 4 and 5).

The "catalyzed" reaction differs from traditional catalyzed reactions in that although the buffer species do speed up the overall rate, they do not lower the activation energy as is typically thought of in chemical catalysis. The buffer species do decrease the reaction barrier by splitting the overall barrier into two (Equations 4 and 5) but the collective barrier height does not necessarily decrease, because there is a minimum barrier that is required to simply drive the thermodynamically unfavorable water dissociation reaction.

An experimental observation that is consistent with this statement is that the rate of water dissociation is enhanced in AEMs, but only when there is evidence of degradation of quaternary ammonium fixed groups to tertiary ammoniums/amines. Tertiary ammoniums contain a labile proton and thus can serve as AH in Reactions 4 and 5, while tertiary amines contain a bonding site for protons and thus can serve as A$^-$ in Reactions 4 and 5. Enhanced water dissociation is also observed in CEMs when 2 Na$^+$ are replaced with Mg$^{2+}$, because Mg$^{2+}$ can serve to activate and stabilize OH$^-$ and therefore facilitates proton transfer via the following reactions:

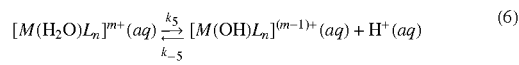

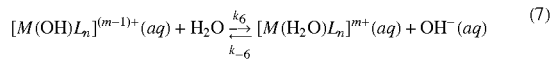

where $[M(H_2O)L_n]^{m+}/[M(OH)L_n]^{(m-1)+}$ are conjugate Brønsted-Lowry acid/base pairs with a cationic center (M), (n+1) total ligands (L), and a formal charge of m+/(m−1)+. For the reactions discussed herein, intermediate steps may also be included.

BRIEF SUMMARY OF THE INVENTION

It is an objective of the present invention to provide membranes for application in electrochemical technologies that operate at non-extreme acidic or basic conditions, as specified in the independent claims. It is a further objective of the invention to improve the rate of water dissociation at low applied bias. Embodiments of the invention are given in the dependent claims. Embodiments of the present invention can be freely combined with each other if they are not mutually exclusive.

In some aspects, the present invention features a catalytic polymer composition comprising a polymer backbone functionalized with catalytic buffer groups, the catalytic buffer groups comprising functional groups or coordination compounds (proton-transfer catalysts), or combinations thereof. As used herein, the term "proton-transfer catalyst" refers to a catalytic substance that increases the rate of transfer of H$^+$ to and from chemical substrates. Preferably, the proton-transfer catalytic functional groups have a pK$_a$ ranging from about 4 to 10, for example, the pK$_a$ may be 7 or close to 7. Also preferred is the catalytic proton-transfer coordination compounds having a pK$_f$ ranging from about 4 to 10, for example, the pK$_f$ may be 7 or close to 7. These catalytic groups can enhance the rate of ion transfer via water dissociation by using organic buffering groups, such as phosphonates, boronates, carboxylates, ammoniums, and heterocycles containing pnictogens and/or chalcogens, and inorganic cations, such as those based on zinc and copper. In other aspects, the present invention provides a bipolar ion-exchange membrane (BPM) comprising an anion-exchange layer in contact with a cation-exchange layer, and a thin polymer layer disposed at the interface of the two layers, where the polymer layer comprises the catalytic polymer composition.

In some embodiments, the catalytic polymer composition may contain a single type of catalytic buffer group (for example, a single proton-transfer functional group or a single proton-transfer coordination compound) or may have multiple catalytic buffer groups (for example, different proton-transfer functional groups, different proton-transfer coordination compounds, or a combination of the two). In some embodiments, using multiple catalytic buffer groups may not significantly increase the overall rate, but will instead widen the range of effective $pK_a$ or $pK_f$ values that result in optimal performance. This occurs because not only does each catalytic buffer group increase the rate of water dissociation, but by reacting with each other additional pathways for overall water dissociation exist. These include three-step reactions where one catalytic buffer group most rapidly generates H+ by Reaction 5 or 6, the other catalytic buffer group most rapidly generates OH− by Reaction 4 or 7, and one of the following reactions occurs between the buffer groups to result in only net overall water dissociation and formation chemistry:

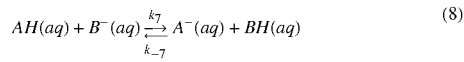  (8)

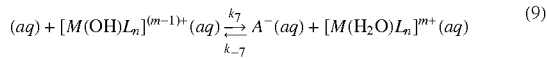  (9)

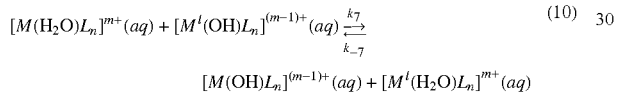  (10)

Although both functional groups and coordination compounds may be used together, this combination may not provide an efficiency enhancement or be important for activity over other combinations of functional groups, but rather may be important for other reasons such as stability.

The membranes of the present invention allow operation at non-extreme acidic or basic conditions because the rate of water dissociation is very effective at low applied bias. The presence of extreme acidic and basic conditions across a BPM generates a large electric potential difference that when over a small distance generates a large electric field that enhances the rate of water dissociation by an empirical EFE process. This ensures a fast rate of water dissociation even when rather poor water dissociation catalysts are used, but at the expense of requiring large overpotentials that waste energy and result in lower efficiencies. Smaller differences in pH, which are common when non-extreme acidic or basic conditions are used, cannot generate sufficient electric fields, thereby resulting in poor EFE water dissociation and relying on the inherent chemical catalytic behavior to provide fast rates of water dissociation. This feature of the present invention may advantageously allow for use of pH differences that are less extreme. As a non-limiting example, the pH difference may be 5 instead of 14, which is a desired gradient in many $CO_2$ electrolyzers that optimally operate at pH~9 at the cathode and pH~14 at the anode.

In yet other aspects, the present invention also features a method of fabricating a BPM for enhancing the rate of water dissociation. The method may include synthesizing a catalytic polymer comprising a polymer backbone with proton-transfer functional groups, proton-transfer coordination compounds, or combinations thereof, adding a layer of said catalytic polymer (106) onto a surface of a cation-exchange membrane (CEM) layer, or a surface of an anion-exchange membrane (AEM) layer, or both, stacking the CEM layer and the AEM layer such that the catalytic polymer layer is disposed between the CEM layer and the AEM layer, and heat pressing the stack of the CEM layer and the AEM layer to form a unified, single structure, thereby producing a BPM.

In some embodiments, the membranes of the present invention may allow for water-based electrochemical technologies to operate efficiently under any acid/base condition, therefore the electrolytes can be specifically tailored to the material requirements of the cell's electrodes and proton-coupled electron-transfer catalysts. In some embodiments, the present invention may be useful in electrochemical devices, such as electrolyzers and fuel cells, which aim to reversibly reduce $CO_2$ to fuels using Earth-abundant electrocatalysts, which are typically most stable and effective in base, for the $O_2/H_2O$ redox reactions, and weak base, for the $CO_2$ reduction redox reactions.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 1 shows non-limiting embodiments of a three-layer bipolar membrane (BPM) of the present invention. The BPM includes an acidic cation-exchange membrane (CEM), a catalyst-containing polymer layer, and an alkaline anion-exchange membrane (AEM). Exploded views are included to show the catalysts of the polymer layers.

FIG. 2A is a schematic of three interfacial reactions that are critical to rapid hydrogen oxidation and water electrolysis (Reaction 1): Hydrogen Oxidation and Evolution Reaction (HOR/HER) (left), Oxygen Reduction and Evolution Reaction (ORR/OER) (right), and Water Dissociation and Formation Reaction (WDR/WFR) (center). The rate of current flow can be increased through the use of proton-transfer catalysts for WDR/WFR. The overall reaction is shown. The opposite of this reaction is water electrolysis.

Figure 4A:
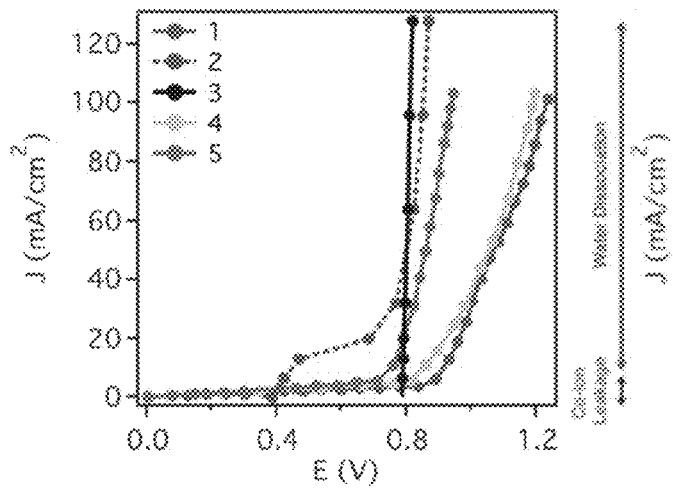
FIG. 4A are prior art examples of catalyzed water dissociation: 1: Fumasep FBM (0.5 M $Na_2SO_4$); 2: FBM (pH 0 and pH 7); 3: FBM (pH 0 and pH 14); 4: SPEEK:QPPO 2-D Interface (0.5 M $Na_2SO_4$); 5: SPEEK:QPPO 3-D Interface (0.5 M $Na_2SO_4$).
Figure 4B:
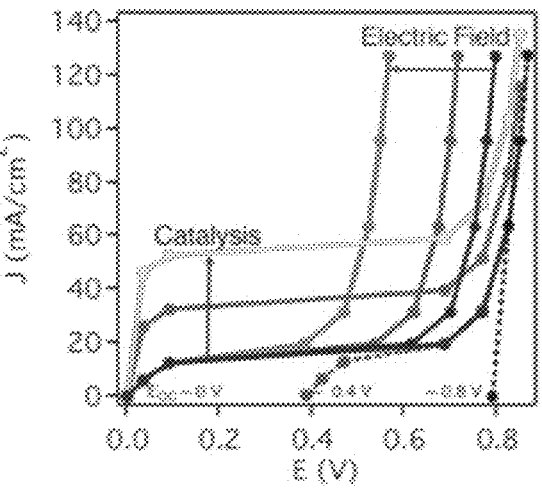

FIG. 4B shows a theoretical current density versus potential curves illustrating the effect of electric field and proton-transfer catalysis for various open-circuit potentials ($E_{OC}$).

Figure 5A:
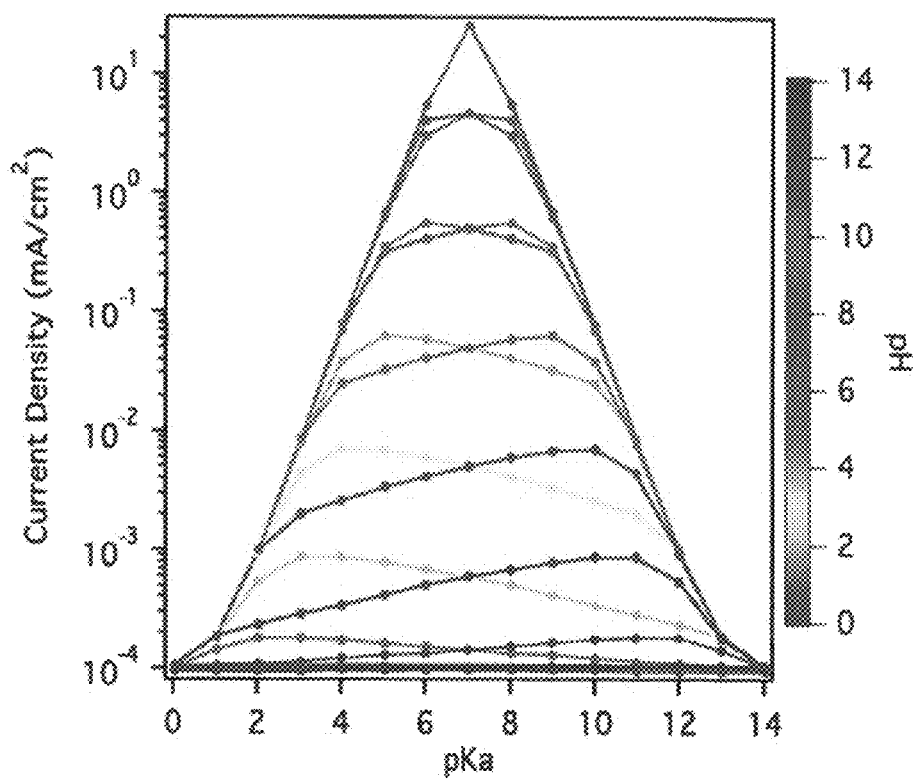
Figure 5B:
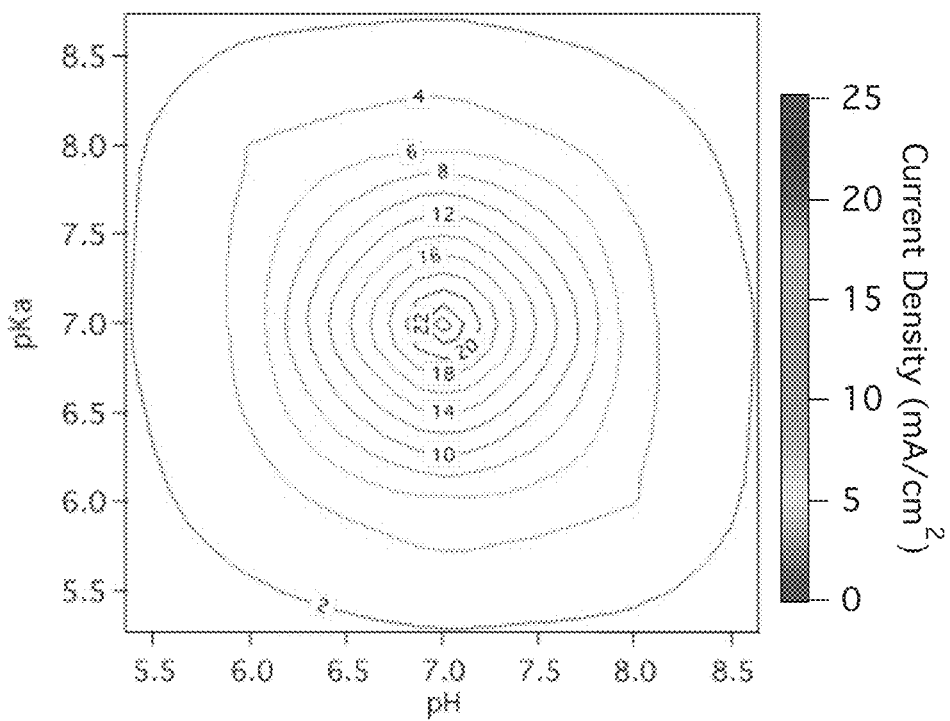

FIGS. 5A-5B show non-limiting examples of potential current densities for water dissociation and water formation, calculated assuming a small region for water dissociation from parametric microkinetic simulations as a function of pH and functional group $pK_a$ at CEM|AEM, over the pH and $pK_a$ range of [0, 14] (FIG. 5A) and [~5.3, ~8.7] (FIG. 5B). The current densities are largest when pH=$pK_a$=7.

Figure 6:
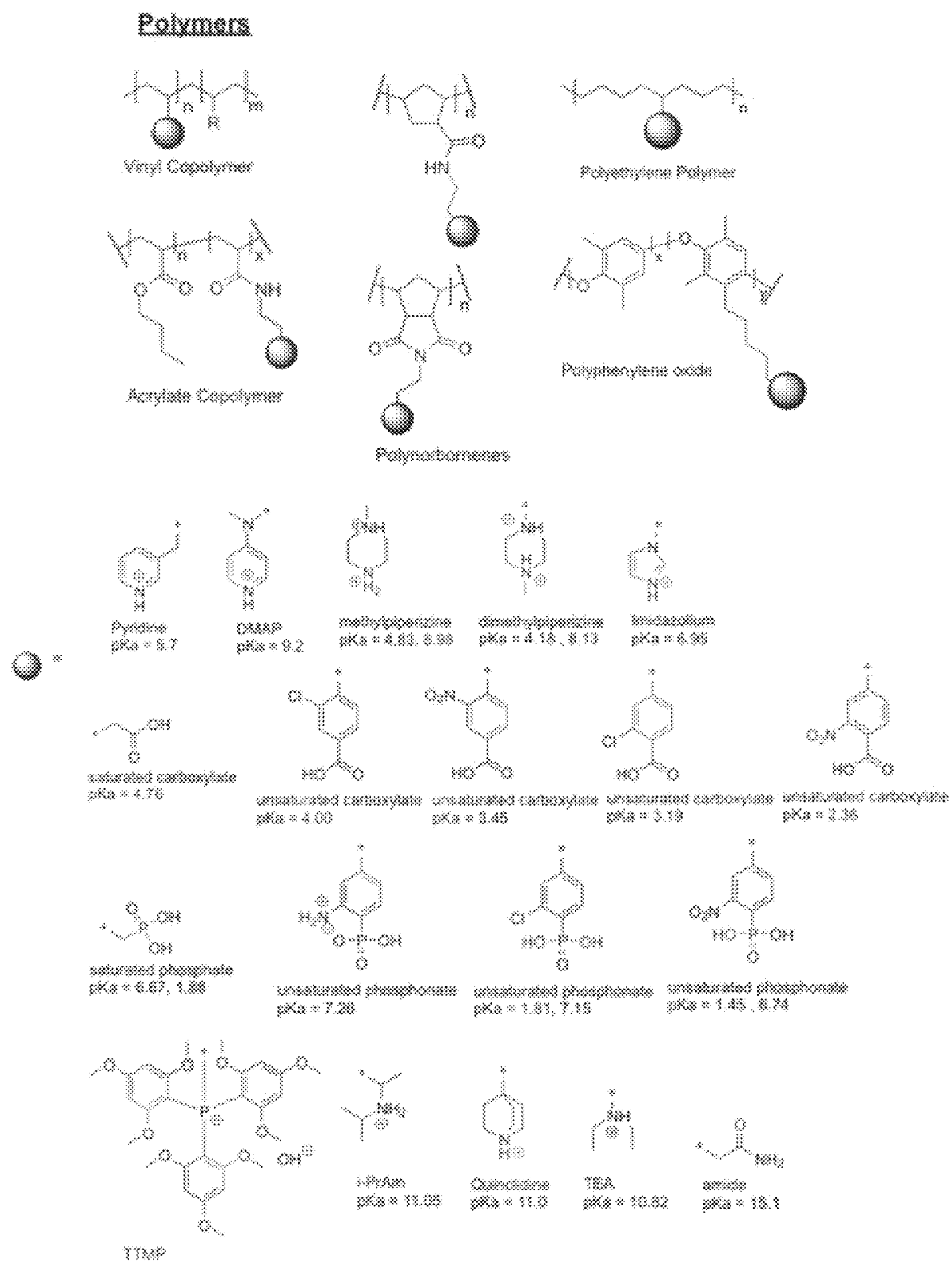

FIG. 6 are non-limiting examples of polymer backbones and Brønsted-Lowry conjugate acid functional groups that can be covalently bonded and positioned at CEM|AEM in BPMs.

Figure 7:
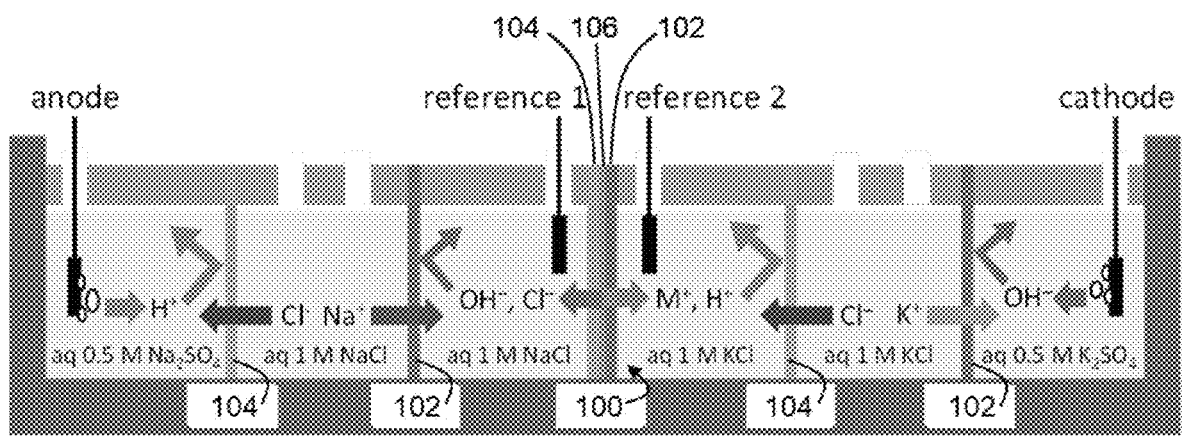

FIG. 7 depicts a four-electrode, six-compartment electrodialysis setup used to most accurately quantify the Faradaic yield for water dissociation from a middle three-layer BPM by measuring pH or ion concentration changes in the reference electrode compartments over time as current is passed.

Figure 8:
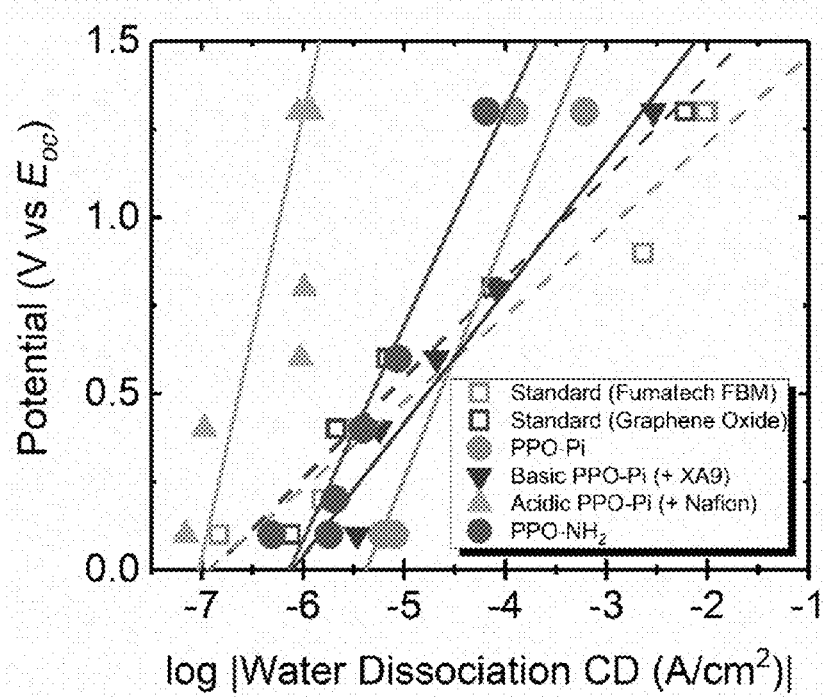

FIG. 8 shows a plot relating water dissociation to applied potential for various membranes. The x-values are largest at y-values close to zero (meaning low applied voltage bias) for the PPO materials, which are those made with phosphonate groups on them, shown as saturated phosphate in FIG. 7. The first two membranes are commercial Fumatech FBM and a made-in-house for a material's system that was recently reported to be highly active (sprinkled on graphene oxide as the middle region). Those do not work as well at low applied bias voltage.

Figure 9:
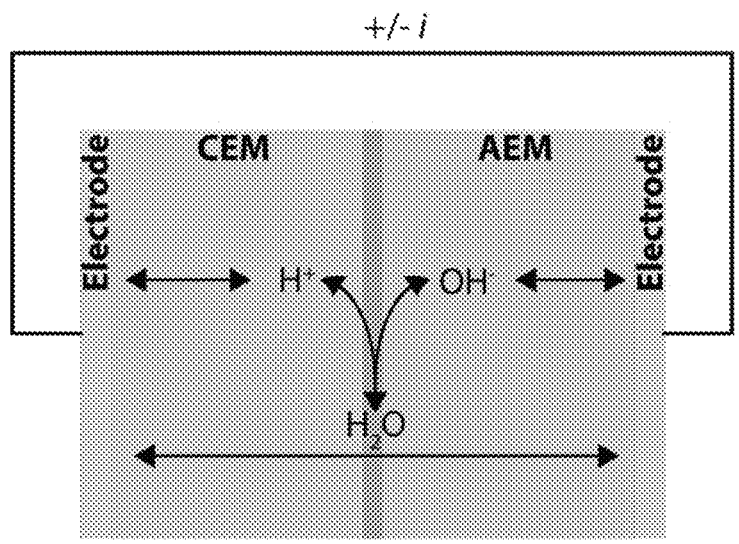

FIG. 9 shows a membrane-electrode assembly arrangement indicating the processes of $H_2O$, $H^+$, and $OH^-$ transport and water dissociation that result in ionic current in a BPM.

Figure 10:
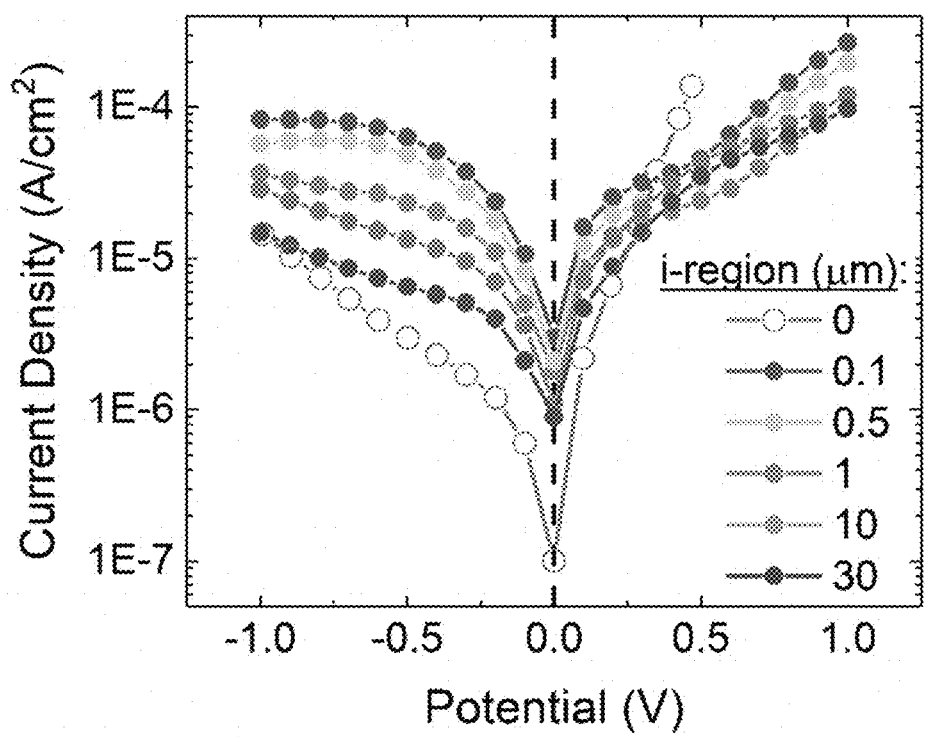

FIG. 10 shows a plot which illustrates the effects of the thickness of the middle polymer layer in a membrane-electrode assembly (MEA). This MEA has phosphonated PPO polymer (70% functionalized) as middle layer, shown as saturated phosphate in FIG. 7. The thinner layers seem to have approximately the same EFE effect as the case with no middle layer, but the currents are about 50× larger than without a catalyst. In this example, the pH was rather extreme across the membrane (thought to have a difference of 0 and 14 but could be as small as 0 and 11), but the conclusions are consistent with those shown in FIG. 8.

Figure 11A:
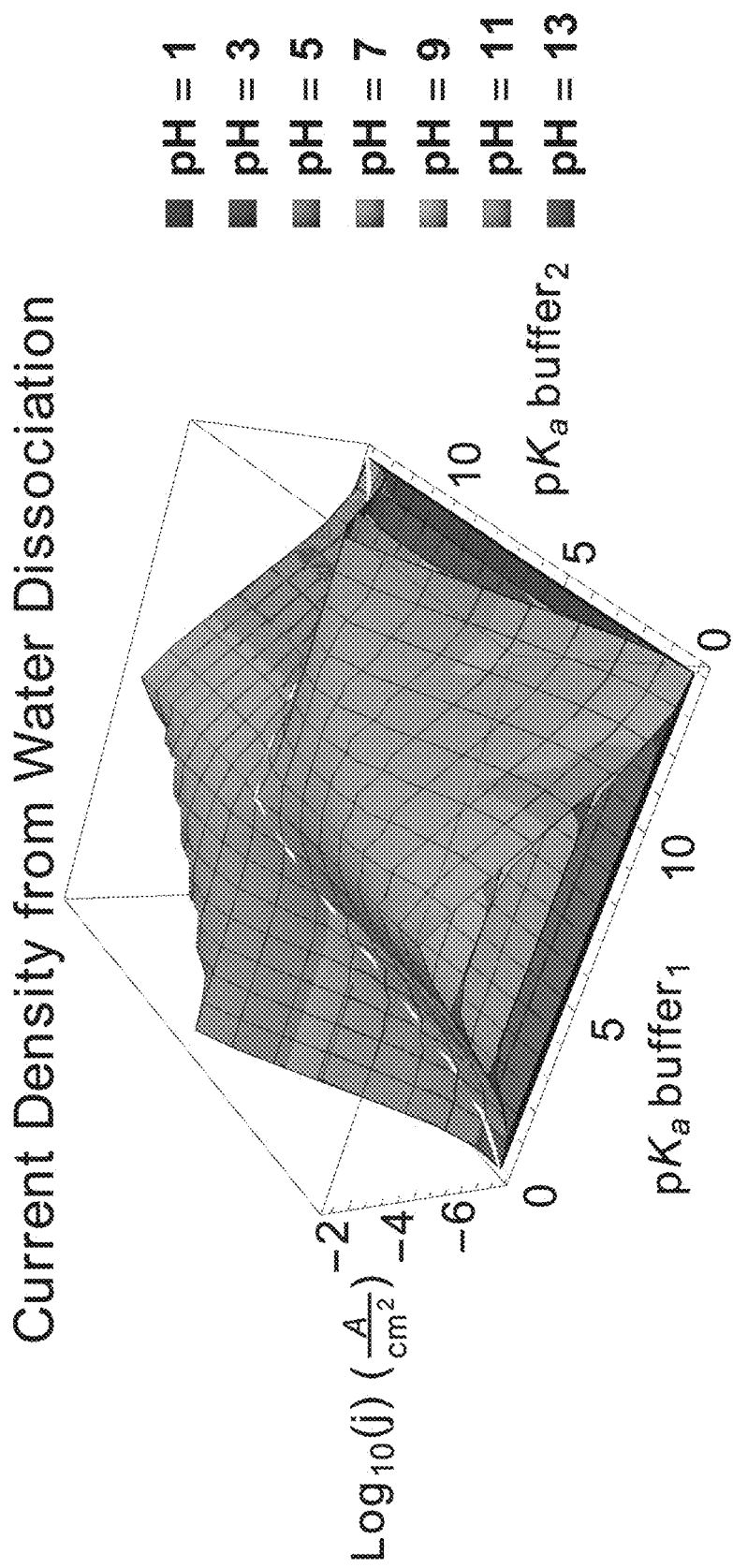

FIG. 11A shows a plot of simulated exchange current density for overall water dissociation using two buffers, each at 0.5 M and at the indicated $pK_a$ values, and with the same results when these are $pK_f$ value, and pH over 10 nm thickness. Data for one buffer at 1 M concentration is shown as a white dashed diagonal line and is the same as that shown in FIG. 5A.

Figure 11B:
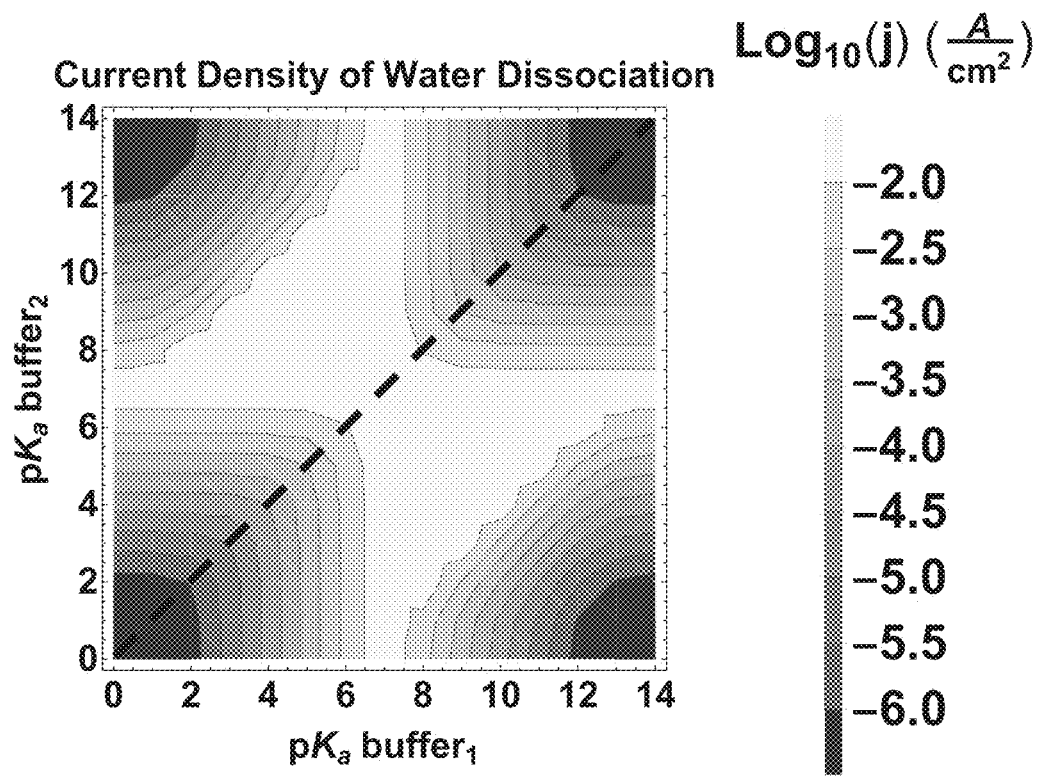

FIG. 11B shows a plot of simulated exchange current density for overall water dissociation using two buffers, each at 0.5 M and at the indicated $pK_a$ values, and pH 7 over 10 nm thickness. Data for one buffer at 1 M concentration is shown as a black dashed diagonal line.

Figure 11C:
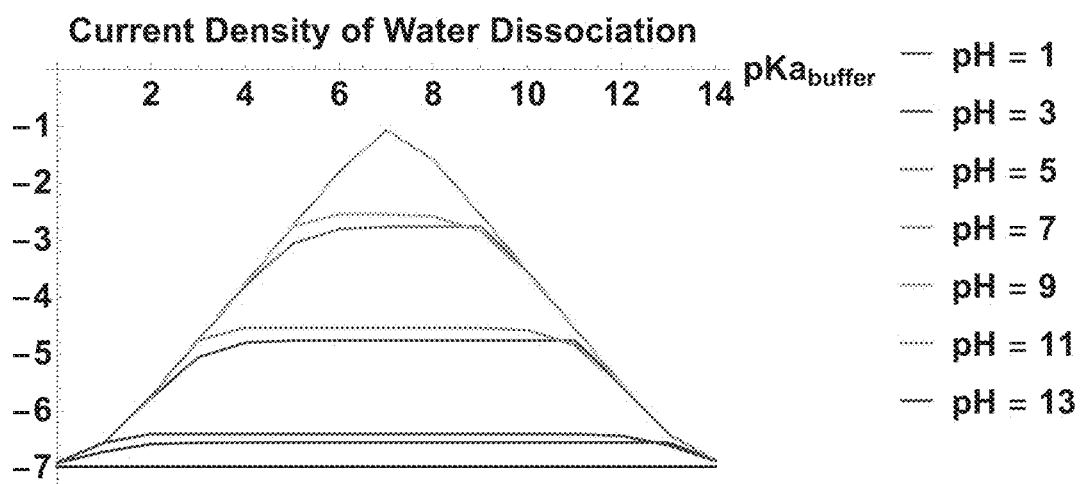

FIG. 11C shows a plot of simulated exchange current density for overall water dissociation using 1 M buffer at the indicated $pK_a$ value, and with the same results when these are $pK_f$ values, and pH value over 10 nm thickness. Data for the condition of no buffer is shown as a black horizontal line at the bottom.

DETAILED DESCRIPTION OF THE INVENTION

Following is a list of elements corresponding to a particular element referred to herein:
100 bipolar membrane (BPM)
102 cation-exchange membrane (CEM)
104 anion-exchange membrane (AEM)
106 catalyst-containing polymer layer As used herein, the term "proton-transfer catalysis" may refer to the catalysis of protonation, deprotonation, hydroxylation, or dihydroxylation (i.e. hydroxide transfer).

It has generally been assumed that EFE water dissociation is strictly required in order to observe greatly enhanced rates of water dissociation, and that applied potential biases of >0.8 V are needed to dissociate water in BPMs, as shown in FIG. 4A, curve 1. However, the previous exceptions suggest that EFE water dissociation is not unique in its ability to enhance the rate of water dissociation. In one study, significant rates of water dissociation were observed at applied potential biases of <0.8V for an electrospun sulfonated poly(ether ether ketone) (SPEEK) and quaternized poly (phenylene oxide) (QPPO) BPM separating electrolytes at the same neutral pH values where the onset potential for rapid water dissociation was −0.7 V and the behavior was characteristic of an EFE process where the current increased exponentially with bias (curve 5). A BPM from WSI Technologies Inc. to separate electrolytes at the same neutral pH demonstrated that the onset potential for rapid water dissociation was ~0.6 V and decreased with temperature, indicating a thermally activated process also indicative of an EFE process. Using Fumasep FBM (FumaTecH) with a pH difference of 7 across the BPM, rapid water dissociation occurred at ~0.45 V and was characteristic of the CR model (curve 2).

In FIG. 4B, hypothetical current density versus potential curves are shown for conditions where the pH difference across the BPM is 0, ~7, and ~14 units, as evidenced by the respective Nernstian $E_{oc}$ values of 0 V, 413 mV=7×59.2 mV, and 828 mV=14×59.2 mV, where (ln 10)RT/F=59.2 mV. This plot also depicts how increasing the local electric field, by decreasing the width of the space-charge region, changes the apparent onset potential of an exponential increase in the rate of water dissociation via an EFE process (horizontal shift curves). These plots also depict the effect of increased catalytic activity for water dissociation as proposed in the CR model, which upon introduction of small overpotential biases immediately enhances the rate of water dissociation (vertical shift in curves). Therefore, without wishing to limit the present invention to a particular theory or mechanism, by decreasing the width of the space-charge region and/or introducing a large concentration of catalytic proton-transfer functional groups and/or a large CEM|AEM interfacial area, it is believed that a current density for water dissociation consistent with state-of-the-art reversible fuel cells can be attained at record low overpotentials and for any pH difference.

Figure 1:
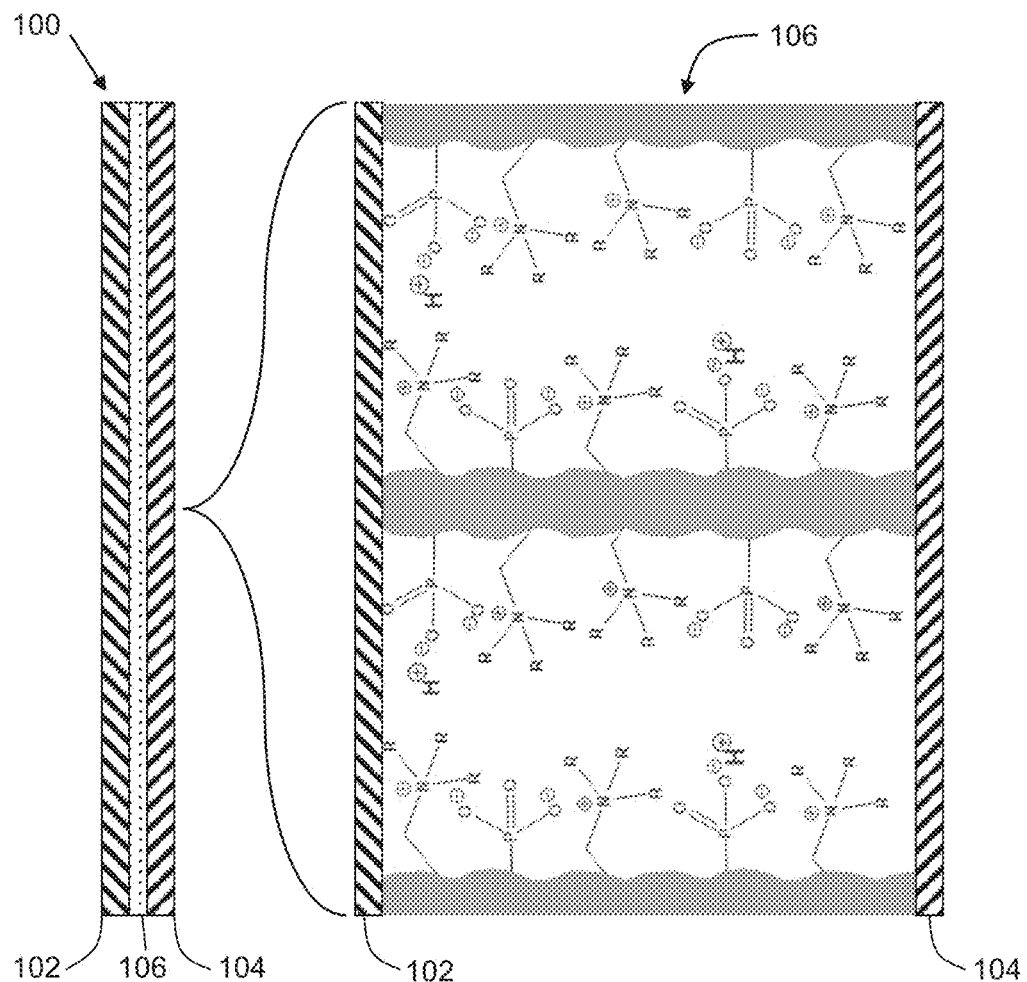
Figure 2A:
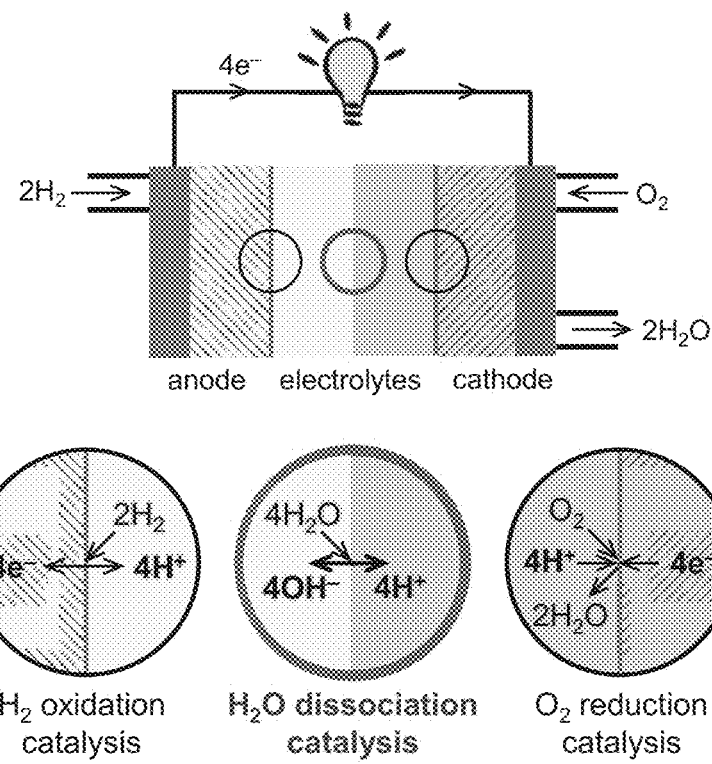
FIG. 2B is a schematic illustrating $CO_2$ or $N_2$ reduction via a membrane-electrode assembly.
Figure 2B:
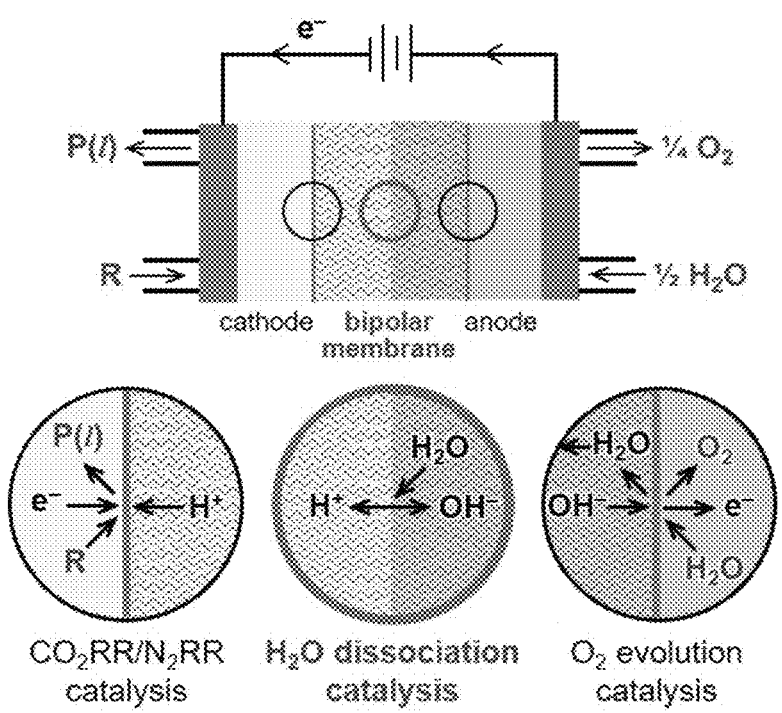
Figure 3A:
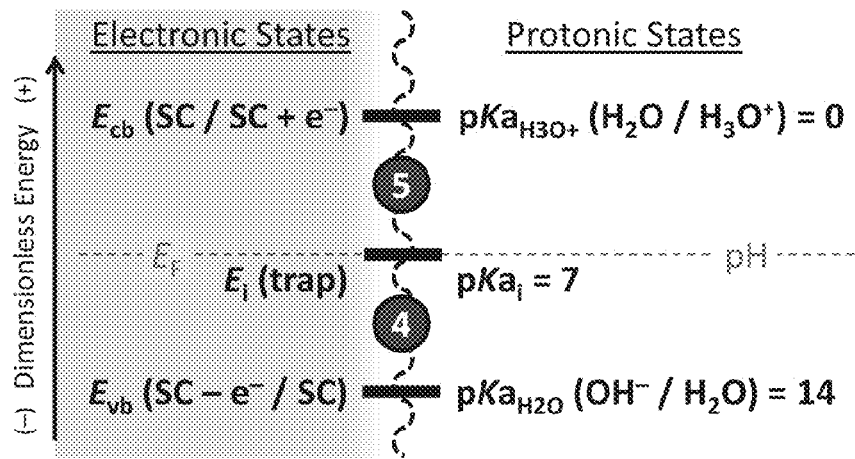
FIG. 3A shows a proposed mechanism for enhanced water dissociation. The mechanism makes an analogy to a semiconductor and trap states (Shockley-Read-Hall model for fast generation/recombination of charged species in a semiconductor).
Figure 3B:
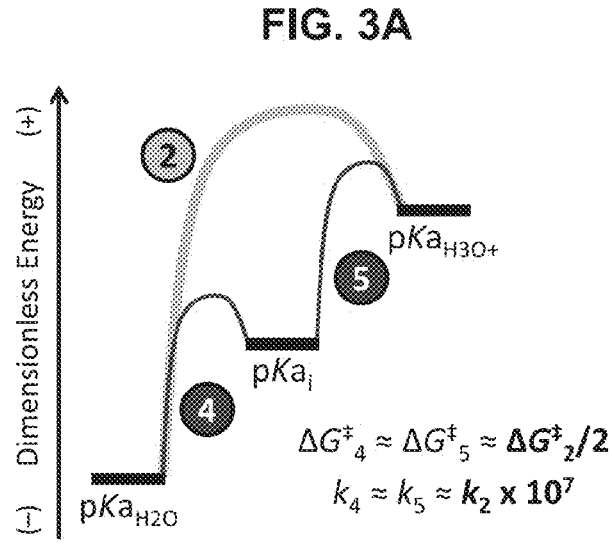
FIG. 3B shows an example reaction barrier diagram for enhanced water dissociation.

Referring now to FIG. 1, the present invention features catalytic polymer compositions, which may be used in bipolar membranes (BPM) (100) for enhancing the rate of water dissociation. In some embodiments, the BPM (100) may comprise a cation-exchange membrane (CEM) layer (102), an anion-exchange membrane (AEM) layer (104), and a catalytic polymer layer (106) interfacing and juxtaposed between the CEM layer (102) and the AEM layer (104). The catalytic polymer layer (106) comprises the catalytic polymer composition. In some embodiments, the catalytic polymer composition can have a polymer backbone having proton-transfer functional groups, proton-transfer coordination compounds, or combinations thereof. In some embodiments, the catalytic polymer may be synthesized by ring-opening polymerization, substitution reactions, bromination and subsequent substitution with a functional group, S—N coupling with amines and sulfonyl halides (e.g. sulfonyl fluoride and sulfonyl chloride), C—N coupling with amines and carboxylic acids or carboxylic acid derivatives (e.g. acyl halides, acyl azides, acylimidazoles, anhydrides, and active esters), click chemistry (e.g. azide and alkyne cycloaddition), cross-coupling such as palladium cross coupling (e.g. Suzuki. Miyaura, Suzuki-Miyaura, Hiyama, and Negishi reactions), electrophilic substitutions (e.g. Friedel-Crafts acylation reactions), nucleophilic substitutions (e.g. Williamson ether synthesis), free radical polymerization, metathesis, reversible addition-fragmentation chain-transfer (RAFT) polymerization, atom-transfer radical polymerization (ATRP), living cationic polymerization, or living anionic polymerization.

In alternative embodiments, the proton-transfer functional groups or proton-transfer coordination compounds may be used to catalyze transfer of protons to or from water without being covalently bound to a polymer backbone in a BPM. As one non-limiting example, the proton-transfer functional groups or proton-transfer coordination compounds may be sandwiched between the CEM and AEM layers of a BPM as small molecules, unbound cations, or as functionalized particles or nanoparticles. In another embodiment, a surface of either the AEM layer or the CEM layer may be functionalized with the proton-transfer functional groups or proton-transfer coordination compounds. In another embodiment, the proton-transfer functional groups or proton-transfer coordination compounds may be bound to a polymer backbone and used as either a single membrane without CEM or AEM layers or in combination with only one of the CEM or AEM layers.

In some embodiments, the catalytic polymer compositions or catalyst-containing polymer layers of the present invention may also be used for $CO_2$ capture via $CO_2$ hydration whereby one of the following reactions is made to take place: either Reaction 11 after water dissociation as described above, or Reaction 12 after Reaction 6, the latter of which is the reported mechanism for carbonic anhydrase:

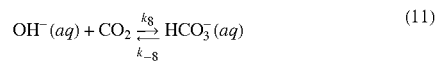

(11)

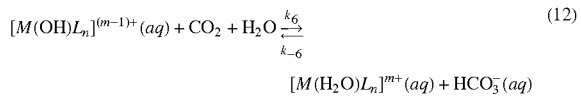

(12)

In these cases, OH⁻ is ultimately transferred to a $CO_2$ substrate via the intermediate catalyst, and not into water. When Reaction 11 is operative, the rate of the overall $CO_2$ hydration reaction to form $HCO_3^-(aq)$ is rate-limited by water dissociation, meaning that the optimal catalyst for water dissociation described above is the same here. When Reaction 12 is operative, the optimal catalyst has a pK that is halfway between the $pK_a$ of $H^+(aq)$, which is 0, and the $pK_a$ of $H_2CO_3$ with or without $CO_2$ hydration, which is 3.5-6.5. If thermodynamically favorable bimolecular reactions are diffusion-limited, then the mechanism that proceeds via Reaction 12 can occur at a rate that is 1-10,000 times faster than the optimal rate when the mechanism proceeds via Reaction 11. In some embodiment, the catalytic polymer compositions of the present invention may catalyze either hydration or dehydration of $CO_2$.

In some embodiments, the BPM may consist of polymers that present non-extreme acidic or basic conditions when hydrated. In other embodiments, the BPM may be immersed in aqueous electrolyte solution where infiltration with salt species results in non-extreme acidic or basic local conditions. In either case, this allows for a BPM that presents non-extreme acidic or basic local conditions at the catholyte or anolyte, which may be more compatible with the desired electrochemical reactions in terms of their activity, selectivity, and overall stability.

A non-limiting embodiment of the catalyst-containing polymer layer is depicted in FIG. 1, which show the hydrated pathways in a near-neutral-pH material. This material may comprise a copolymer of cationic quaternary ammonium groups and anionic phosphonate groups with a $pK_a \approx 7$ to catalyze water dissociation and to buffer protons in order to maintain desired near-neutral pH conditions while rapidly conducting $H^+$ and $OH^-$.

According to other embodiments, the present invention provides a method of fabricating a bipolar membrane (BPM) (100) for enhancing the rate of water dissociation. In one embodiment, the method may comprise synthesizing a catalytic polymer comprising a polymer backbone with proton-transfer functional groups, proton-transfer coordination compounds, or combinations thereof, adding a layer of said catalytic polymer (106) onto a surface of a cation-exchange membrane (CEM) layer (102), adding a layer of said catalytic polymer (106) onto a surface of an anion-exchange membrane (AEM) layer (104), stacking the CEM layer (102) and the AEM layer (104) such that the surfaces with the catalytic polymer layers (106) are interfacing each other, and heat pressing the stack of the CEM layer (102) and the AEM layer (104) to form a single structure having the unified catalytic polymer layer (106) disposed in between the CEM layer (102) and the AEM layer (104), thereby producing the BPM (100).

In some embodiments, the catalytic polymer layer (106) may be added to the surface of the CEM layer (102) or the AEM layer (104) by drop-coating, blade-coating, or spin-coating the catalytic polymer directly onto the CEM layer (102) or the AEM layer (104). In some other embodiments, the catalytic polymer layer (106) may be added to the surface of the CEM layer (102) or the AEM layer (104) in a layer-by-layer (LbL) assembly to allow for control of polymer interlayer thickness. In one embodiment, the LbL assembly may comprise polymerization of the catalytic polymer directly on the surface of the CEM layer (102) or the AEM layer (104). In another embodiment, the LbL assembly may comprise dip-coating or spray-coating the catalytic polymer onto the CEM layer (102) or the AEM layer (104).

In some embodiments, the polymer backbone may comprise a vinyl copolymer, an acrylate copolymer, poly(benzimidazole), poly(phenylene oxide), polynorbornene, polysulfone, polystyrene, or polyethylene, and related polymers. However, any suitable polymer may be used as the polymer backbone without deviating from the scope of the present invention. In other embodiments, the catalytic proton-transfer functional groups may comprise Brønsted-Lowry conjugate acid/base functional groups. Examples of Brønsted-Lowry conjugate acid/base functional groups include, but are not limited to, amines, pyridines, pyrazines, pyrimidines, pyridazines, imidazoles, piperazines, morpholines, boronates, phosphonates, carboxylates, nucleobases such as guanine, cytosine, adenine, thymine, uracil, amino acids, and related compounds. In one example, pyrimidines have low and high $pK_a$s (1 and 10). Guanine may be used to incorporate a functional group with several $pK_a$s (3, 9, and 12). It is to be understood that other Brønsted-Lowry conjugate acid/base functional groups may be used in accordance with the present invention.

In one embodiment, Lewis acidic cations in the coordination compounds may comprise Zn, Cu, Fe, or Pb. For example, the Lewis acidic cations may be Zn(II), Cu(II), Fe(II), or Pb(II), and may be chelated to enhance stability and localization. Other Lewis acidic cations, formally chelated or not, may be used without deviating from the scope of the present invention.

In some embodiments, the proton-transfer functional groups have a $pK_a$ in the range of about 4 to 10. In other embodiments, the proton-transfer functional groups have a $pK_a$ in the range of about 5 to 9. In preferred embodiments, the proton-transfer functional groups have a $pK_a$ in the range of about 6 to 8. Most preferably, the proton-transfer functional groups have a $pK_a$ of about 7 or close to 7.

In some embodiments, the proton-transfer coordination compounds have a $pK_f$ value for binding $OH^-$ in the range of about 4 to 10. In other embodiments, the proton-transfer coordination compounds have a $pK_f$ in the range of about 5 to 9. In preferred embodiments, the proton-transfer coordination compounds have a $pK_f$ in the range of about 6 to 8. Most preferably, the proton-transfer coordination compounds have a $pK_f$ of about 7 or close to 7.

In preferred embodiments, the pH of the catalytic polymer is about 7 or close to 7. In some embodiments, the pH of the catalytic polymer ranges from about 4 to 10. In other embodiments, the pH of the catalytic polymer ranges from about 5 to 9. In preferred embodiments, the pH of the catalytic polymer ranges from about 6 to 8. Without wishing to limit the present invention, the current density of the catalytic polymer is largest when the pH and $pK_a$ or $pK_f$ is about 7 or close to 7, as shown in FIGS. 5A-5B. In some embodiments, the current density for water dissociation may be attained for any pH difference. In some desirable embodiments, the pH on one side of the membrane is slightly acidic and strong base is used on the other side of the membrane, partially because the oxygen evolution reaction (OER) is usually most effective at inexpensive catalysts around a pH of 14. As a non-limiting example, the pH may be 14 on one side of the membrane and 7 for the catholyte on the other side of the membrane such that the local conditions are benign. As another non-limiting example, pH values of 9 and 14 may be used together because 9 is slightly more acidic than the second $pK_a$ of $H_2CO_3$, which means that little $CO_3^{2-}$ (carbonate) forms. This is important because carbonate is not very soluble in the presence of most salts or cationic impurities and thus will precipitate out as a solid and clog the membrane, slowing its ability to transport species.

Again, without wishing to limit the present invention to a particular theory or mechanism, it is believed that for any solution/solvent, the $pK_a$ of the proton-transfer functional group catalysts, the $pK_f$ of the proton-transfer coordination compound catalysts, and the pH of the solvated membrane are preferably at or near the midpoint of the $pK_a$ of the protonated solvent molecules and the $pK_a$ of the deprotonated solvent molecules. At this pH, $pK_a$, and/or $pK_f$ the current density of the catalytic polymer is largest.

In some embodiments, the width of the catalytic polymer layer (106) may range from about 1 nm to about 10 μm. For instance, the width may be about 1-10 nm, 10 nm-100 nm, 100 nm-1 μm, or 1-10 μm. In yet other embodiments, the width of the catalytic polymer layer (106) may be greater than 10 μm, for example, 20 μm.

In other embodiments, a concentration of the proton-transfer functional groups and/or proton-transfer coordination compounds range from about 0.01 M to about 10 M. For example, the concentration of the proton-transfer catalytic functional groups may be about 0.01-0.1 M, 0.1-1 M, 1-5 M, or 5-10 M. In yet other embodiments, the concentration of the catalytic proton-transfer functional groups may be greater than 10 M, for example, 20 M.

Electrolyzers and fuel cells operate at most at 1-10 A/cm². Thus, a membrane must be able to pass that current density as a rate of ion transport. The data reported herein show that using optimal proton-transfer catalytic functional groups at 1 M concentration and over the thickness of 10 nm, microscopically reversible rates as current densities of >0.1 A/cm² are possible at effectively zero bias and thus zero wasted voltage across the membrane. Surface roughening, increasing the concentration of catalytic groups, and increasing the thickness of the catalytic polymer layer will increase the rate by these same scaling factors, unless the reaction is limited by another process such as mass transport of water into or out of the membrane, which can be overcome by using thinner catalytic polymer layers. To achieve 1-10 A/cm², small biases will be required but can be less than biases required for these same current densities at state-of-the-art electrocatalysts for the $O_2$ evolution reaction and the $O_2$ reduction reaction. Therefore, in some other embodiments, an applied potential bias to dissociate water at 1-10 A/cm² is less than 0.5 V. As non-limiting examples, the applied potential bias required to dissociate water may be less than 0.3 V or less than 0.1 V. As additional non-limiting examples, a sufficient rate for water dissociation may be 50-10⁵ M/s, which as a current density over 10 nm thickness equals 0.005-10 A/cm². In some embodiments, a large current density for water dissociation and formation (>5 mA/cm²) may be attained for any pH difference In conjunction with any of the aforementioned embodiments, the present invention may feature an electrochemical device comprising a bipolar membrane (100). The BPM of the electrochemical device may be according to any of the BPMs described herein. Examples of the electrochemical device include, but are not limited to, fuel cells, electrolyzers, $CO_2$ capture devices, and solar fuels devices.

In other embodiments, the present invention further provides a method for enhancing the rate of water dissociation in an electrochemical process. The method may comprise providing a bipolar membrane (BPM) (100) according to any of the BPMs described herein, and utilizing the BPM (100) in the electrochemical process. Without wishing to be bound to a particular theory or mechanism, the BPM (100) can increase the water dissociation rate and lower the applied potential bias required for rapid rates of water dissociation. A rapid rate of water dissociation is considered to be any rate that is at least two orders-of-magnitude faster than the uncatalyzed rate of $10^{-3}$ M/s, which as a current density over 10 nm thickness equals 1 μA/cm².

Referring to FIG. 5A, proton-transfer Brønsted-Lowry functional groups with $pK_a \approx 7$ can be most effective at catalyzing water dissociation. Therefore, protonated/deprotonated amines, pyridines, pyrazines, pyrimidines, pyridazines, imidazoles, piperazines, morpholines, boronates, phosphonates, carboxylates, or nucleobases or amino acids, and related compounds can serve as proton-transfer catalysts for water dissociation (AH/A⁻ in Reactions 4 and 5). For example, deprotonated phosphonic acid groups can serve as optimal proton-transfer catalyst for water dissociation given that their more basic protic group has a $pK_a \approx 7$. However, in order for this protonation state to best serve the role of AH/A⁻ and result in rapid rates of water dissociation, approximately half of the groups should be singly deprotonated and the other half of the groups should be doubly deprotonated to a state that would exist at pH≈7.

To achieve this, quaternary ammonium groups or other cationic groups may be combined in a 3:1 to 3:2 molar ratio with phosphonic acid groups and drive their ion pairing through phosphonic acid deprotonation and dialysis of the counterions, such as H⁺ and Cl⁻, as shown in FIG. 1. These materials can be fabricated by two methods: mixing two different polymers or ionomers, or synthesizing copolymers containing both functional groups at various molar ratios. These molar ratios may exceed 3:1 because not all functional groups may ion pair to the desired ratio. Electrochemical measurements may be conducted using three-layer BPMs with the phosphonate-containing polymers sandwiched between a commercial CEM, like Nafion® 111, Nafion® 112, Nafion® 117, or related, and a commercial AEM, like Neosepta® AHA, Sustanion® X37, Sustanion® XA9, or related, as described below.

FIG. 8 shows that (Basic PPO-Pi and Acidic PPO-Pi), where "+XA9" means that an anion-exchange ionomer with quaternary ammoniums were mixed in so that the pH was more basic—which is a decent condition for these samples—and "+Nafion" means that a solution of cation-exchange material with acidic sulfonic acids were mixed in so that the pH was more acidic—which is the worst condition for these samples. PPO—NH2 means a polymer with an ammonium/amine functional group whose $pK_a$ is not as close to 7 as the PPO-Pi ones. This worked rather well—the x-intercept is the current density of interest that correlates to the modeled data current densities. Additionally, the data in FIG. 8 only uses the "PPO-Pi" with varied thickness. In both of these figures an AEM and CEM was used to sandwich this layer. Also, "PPO-Pi" means phosphonated PPO polymer whose structure was shown in FIG. 6. There are several phosphonated groups shown in that figure and this Pi one is the "saturated phosphate one."

While Brønsted-Lowry conjugate bases like phosphonates are effective at stabilizing H⁺ during the process of water dissociation, water dissociation can also be catalyzed through stabilization of OH⁻ using Lewis acidic cations ($[M(H_2O)L_n]^{m+}/[M(OH)L_n]^{(m-1)+}$ in Reactions 6 and 7). For example, analogous to $pK_a$ values for Brønsted-Lowry acids, Lewis acidic hydrated Zn(II) ions have a $pK_f$ value of ~5 for binding OH⁻ and forming Zn(II)—OH species, which stabilize an OH⁻ intermediate during the reaction of carbon dioxide and water to form bicarbonate and H. As such, Zn(II) and other ions with $pK_f \approx 7$ (e.g. Cu(II) with $pK_f$=6.5 and Pb(II) with $pK_f$=6.4) may be incorporated into polymers through complexation with functional groups such as imidazoles and polypyridines that are covalently bound to various polymer backbones. For example, vinyl and acrylate copolymers can be synthesized, functionalized polyethylene and polynorbornene polymers can be synthesized by ring-opening metathesis polymerization, and functionalized poly (phenylene oxide) can be synthesized by Friedel-Crafts acylation of poly(phenylene oxide).

Commercial BPMs utilize a variety of interfacial polymer layers at CEM|AEM to catalyze water dissociation, such as cationic microbeads in polystyrene-co-polyvinylbenzoyl chloride, polysulfone containing tertiary and quaternary amines, a polyacrylic acid/polyvinylpyridine salt complex, and hyperbranched polyesters containing amines or hydroxyl groups. Referring to FIG. 6, combinations of specific Brønsted-Lowry functional groups, coordination compounds, and polymer backbones may be used at CEM|AEM. These polymers, copolymers, and composite polymers at CEM|AEM may be incorporated by casting them onto OEMs and AEMs and then heat pressing them to form a single structure.

In a non-limiting embodiment, the CEM may be Nafion® 112. In another non-limiting embodiment, the AEM may be Neosepta® AHA or Sustanion® X37/XA9. There are several techniques that can be employed to functionalize CEM|AEM with the catalytic polymers and form a BPM. Examples of which include, but are not limited to, drop-coating, blade-coating, or spin-coating the catalytic polymers directly on to the CEM, followed by heat pressing an AEM on top with a variable-temperature hydraulic membrane press. Processing conditions, such as deposition rate, pressure, time, and temperature, may be varied to obtain materials with substantial mechanical robustness and adhesion so that electrochemical measurements can be conducted. This can also be achieved by covalently linking thin films via chemical modification of their interfaces or by synthesizing the polymers from one monolithic polymer backbone structure.

In some embodiments, it is desirable to use methods that afford precise control over catalyst polymer layer thickness. Thus, a layer-by-layer (LbL) assembly of polymers onto OEMs may allow for finer control over polymer thickness. In one embodiment, the LbL technique may include dip coating. In another embodiment, the LbL technique may comprise spraying to isolate one side of the membrane and increase the throughput of generating LbL membranes. In other embodiment, gas-phase chemistry may be utilized to polymerize thin films on membrane surfaces. As an example, OEMs are placed inside a vacuum chamber containing a crucible with an oxidation catalyst (i.e. $FeCl_3$) that is heated so that the catalyst sublimates. Then, a stream of monomer is introduced through the chamber and upon mixing with the catalyst, polymerization occurs on the substrate CEM surface. These techniques can afford conformal coating of polymer films with precisely controlled thicknesses.

Example

The following is a non-limiting example of the present invention. It is to be understood that said example is not intended to limit the present invention in any way. Equivalents or substitutes are within the scope of the present invention.

Microkinetic Models.

In order to determine functional group concentrations and $pK_a$ values that are desired at CEM|AEM for effective proton-transfer catalysis of the water dissociation reaction, 0-D and 1-D kinetic models may be implemented using the COMSOL Reaction Engineering module and the COMSOL finite-element solver to approximate solutions to the multiple coupled partial differential equations or 0-D analytical solutions to the Henderson-Hasselbalch equation and kinetic rate laws with knowledge of the rate constants for the proton-transfer reactions. Unique to the 1-D models, an electric field can be imposed to simulate EFE water dissociation. More realistic kinetic rate constants and CEM|AEM properties may be gleaned from the atomistic and coarse-grained simulations to couple the two modeling regimes.

The inventors have performed preliminary parametric microkinetic simulations to determine the effects of pH and $pK_a$ of catalytic proton-transfer groups on ionic current density, and where the results are the same when instead of $pK_a$ values, $pK_f$ values for coordination compounds are used. The simulations were carried out assuming 1 M catalyst groups over a 10 nm thick region, diffusion-limited second-order proton-transfer reactions, and the literature value for the zeroth-order reaction for water dissociation of $10^{-3}$ M/s. It was found that for any $pK_a$ value, the maximum rate of water dissociation occurs at pH 7 and that the exchange current density is largest when the $pK_a$ of the catalytic groups is 7, resulting in an exchange current density of ~10-100 mA cm$^{-2}$ (FIG. 5A-5B). Exchange current densities represent the rate of water dissociation and water formation at equilibrium and therefore, at zero applied bias overpotential. This exchange current density for water dissociation by a CR mechanism is more than an order-of-magnitude larger than any values observed experimentally under modest polarization biases of <0.5 V. Also notable is that the rate of water dissociation is affected little by reasonable variations in reorganization energy and electronic coupling, which means that a simplified Eyring/Arrhenius-type expression for the thermally activated H$^+$ transfer processes predicts similar behavior to that observed from a Marcus-type model.

Of great practical importance is that the rate of water dissociation increases linearly with concentration of catalyst, width of the catalyst-containing region, and CEM|AEM surface area, suggesting that 0.1 A/cm$^2$ current densities relevant to practical reversible fuel cells will be possible at little-to-no overpotential and separating electrolytes at any pH value, therefore, enabling proton-coupled electron-transfer catalysts that are stable at any pH value to be used. For example, considering a concentration of proton-transfer catalysts with $pK_a$=7 increased from 1 M to 10 M and over a thickness of 100 nm instead of 10 nm, exchange current densities may be increase by a factor of 100 to >1 A/cm$^2$ at pH=7.

These enhanced rates of water dissociation are purely due to the CR model. While this seems at odds with the EFE mechanism that based on prior literature is postulated to dominate experimentally observed water dissociation behavior, a simple analysis suggests a purely CR mechanism can result in rapid rates of water dissociation at very low overpotentials. Rapid rates of water dissociation require a large density/concentration of proton-transfer catalysts with $pK_a$=7, which is the midpoint between the $pK_a$ of H$^+$(aq) and H$_2$O, and operation at pH 7 so that there is an equal concentration of each form of the proton-transfer catalyst, and thus equal capture cross section, for the AH and A$^-$ proton-transfer functional group catalysts in Reactions 4 and 5 or $[M(H_2O)L_n]^{m+}$ and $[M(OH)L_n]^{(m-1)+}$ proton-transfer coordination compound catalysts in Reactions 6 and 7. Results from this analysis are consistent with the data in FIGS. 5A-5B that were obtained using the microkinetic models, thus further validating them.

Macroscale Poisson-Nernst-Planck Simulations.

Information regarding the identity and optimal properties of functional groups for water dissociation gleaned from the microkinetic simulations may be incorporated into a macroscale BPM model. This model can include coupling of the microkinetic modeling framework directly into a 1-D and 2-D Poisson-Nernst-Planck model to compute the behavior of BPMs under different acid, base, and salt electrolyte conditions.

Preliminary results obtained from the Poisson-Nernst-Planck model, that did not include microkinetic processes, indicate that differences in in the concentration of H$^+$ and H$^-$ across CEM|AEM are indefinitely stable when the contacting phase for the BPM is deionized water. Significant ion crossover was shown to occur when the contacting phases were modeled to be aqueous electrolytes, and the ion crossover rates were found to be related to the concentrations of H$^+$ and OH$^-$, as predicted by simple Donnan theory. To the inventors' knowledge, this is the first BPM model that takes into consideration the effects of ions other than H$^+$ and OH$^-$. Results from the model also indicate that an ion-concentration-dependent electrostatic potential barrier exists at the BPM/solution interfaces, and a large potential barrier at CEM|AEM with a magnitude that is independent of the concentration of ions in the liquid electrolyte but dependent on the rate of ion crossover. Also, by incorporating properties of commercial BPMs, a space-charge region that is ~2 nm wide is observed at CEM|AEM. The general Poisson-Nernst-Planck model can also output the spatial distribution of protonation and deprotonation reactions.

Experimental Electrochemical Measurements.

Fuel cells are generally evaluated as membrane-electrode assemblies (MEAs) with gaseous humidified H$_2$ and O$_2$ feeds. One benefit of MEAs is that deionized water can be used in the feed stream resulting in zero ion crossover at open circuit in the absence of an ionic current. Without confounding ion crossover processes, MEAs enables accurate quantification of extremely low current densities from uncatalyzed water dissociation so that the effects of catalyst layers can be accurately compared. However, one drawback of MEAs driving H$_2$ and O$_2$ redox chemistry is that they do not easily allow selective measurement of solely the electrochemical performance of the BPM, and thus the rate of water dissociation, because current-voltage behavior is convoluted by overpotentials from the redox reactions. This can almost entirely be overcome by driving fast isoenergetic redox reactions at the electrodes. Therefore, by flowing humidified forming gas (5% H$_2$ in N$_2$) or pure hydrogen gas past large-area platinized Pt electrodes in both the anode and cathode chambers, they function as reversible hydrogen electrodes (RHEs) with well-defined potentials, zero difference in free energy across the membrane, and low overpotentials for H$_2$ oxidation and H$^+$ reduction redox reactions. This can allow for the performance of the BPM and rate of water dissociation to be accurately measured.

Four-electrode measurements using BPMs wetted by near-neutral pH electrolyte solutions have several advantages. For example, through use of a four-electrode, six-compartment cell as shown in FIG. 7, electrochemical measurements afford facile determination of the Faradaic yield and rate of water dissociation in comparison to unintentional ion crossover. This is performed by passing a known amount of charge through the system and comparing that value to the magnitude of the change in pH and/or ion concentration as measured by ICP-MS or ICP-OES. Preliminary data obtained for a phosphonate containing polymer and copolymer as part of a three-layer BPM indicated a >35% Faradaic yield for water dissociation at 100 mV overpotential bias when wetted by near-neutral pH electrolyte solutions. To the inventors' knowledge, this is the largest Faradaic yield for water dissociation at the lowest overpotential ever reported for a BPM in contact with near-neutral pH electrolyte solutions.

Four-electrode measurements also enable the inner Galvani potential difference across the BPM to be measured directly using two nominally identical reference electrodes.

The inner Galvani potential difference is the total electric potential drop across the membrane, which in combination with measurements of the thickness of the proton-transfer catalyst layer, can be used to accurately determine the strength of the electric field, which is an important parameter in the EFE model and all proposed numerical models. Thus, two-electrode MEA electrochemical measurements of BPMs in contact with humidified forming gas or pure hydrogen gas may be performed to quantify small rates of water dissociation, as well as four-electrode six-compartment electrochemical measurements (FIG. 8) of BPMs wetted by near-neutral pH electrolyte solutions to quantify Faradaic yields for water dissociation and electric potential drops.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A bipolar membrane (BPM) (100) for enhancing a rate of water dissociation or formation, said BPM (100) comprising a cation-exchange membrane (CEM) layer (102), an anion-exchange membrane (AEM) layer (104), and a catalytic polymer layer (106) interfacing and juxtaposed between the CEM layer (102) and the AEM layer (104),
   wherein the catalytic polymer layer (106) comprises a polymer backbone functionalized with catalytic buffer groups, the catalytic buffer groups comprising proton-transfer functional groups, proton-transfer coordination compounds, or combinations thereof, wherein the proton-transfer catalytic functional groups have a $pk_a$ in the range of about 6 to 8 and the proton-transfer catalytic coordination compounds have a $pK_f$ in the range of about 4 to 10,
   wherein the proton-transfer functional groups comprise amines, pyrazines pyrimidines, pyridazines, imidazoles, piperazines, morpholines, boronates, phosphonates, nucleobases, or amino acids, and
   wherein the proton-transfer coordination compounds comprise ligated cationic zinc, copper, iron, or lead.

2. The BPM (100) of claim 1, wherein the $pK_f$ is in the range of about 6 to 8.

3. The BPM (100) of claim 1, wherein a width of the catalytic polymer layer (106) ranges from about 1 nm to about 10 μm.

4. The BPM (100) of claim 1, wherein the polymer backbone comprises two or more catalytic buffer groups.

5. A bipolar membrane (BPM) (100) for enhancing a rate of water dissociation or formation, said BPM (100) comprising a cation-exchange membrane (CEM) layer (102), an anion-exchange membrane (AEM) layer (104), and a catalytic polymer layer (106) interfacing and juxtaposed between the CEM layer (102) and the AEM layer (104),
   wherein the catalytic polymer layer (106) comprises a polymer backbone functionalized with catalytic buffer groups, the catalytic buffer groups comprising proton-transfer functional groups, proton-transfer coordination compounds, or combinations thereof, wherein the proton-transfer catalytic functional groups have a $pK_a$ in the range of 6 to 8 and the proton-transfer catalytic coordination compounds have a $pK_f$ in the range of 6 to 8.

6. The BPM (100) of claim 5, wherein the polymer backbone comprises two or more catalytic buffer groups.

* * * * *